United States Patent
Akasaka et al.

(10) Patent No.: US 7,249,250 B1
(45) Date of Patent: Jul. 24, 2007

(54) REMOTE ORDER ACCEPTANCE DESIGN SYSTEM AND ELEVATOR REMOTE ORDER ACCEPTANCE METHOD

(75) Inventors: Shingo Akasaka, Yokohama (JP); Atsuhiro Ishida, Yokohama (JP); Shinichi Taniguchi, Yokohama (JP); Masahiro Oka, Hitachinaka (JP); Akihiko Morita, Tokyo (JP); Hideaki Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 522 days.

(21) Appl. No.: 10/069,374

(22) PCT Filed: Aug. 30, 2000

(86) PCT No.: PCT/JP00/05874

§ 371 (c)(1),
(2), (4) Date: Feb. 25, 2002

(87) PCT Pub. No.: WO01/16812

PCT Pub. Date: Mar. 8, 2001

(30) Foreign Application Priority Data

Aug. 31, 1999 (JP) .................................. 11-244955
Mar. 31, 2000 (JP) .............................. 2000-099724

(51) Int. Cl.
   *G06F 17/50* (2006.01)
(52) U.S. Cl. .................... 713/1; 703/1; 705/10; 700/97; 700/121
(58) Field of Classification Search .............. 713/1; 700/97, 98, 121; 709/204
See application file for complete search history.

(56) References Cited

U.S. PATENT DOCUMENTS 5,576,965 A    11/1996  Akasaka et al.
6,134,338 A *  10/2000  Solberg et al. ............. 382/113

(Continued)

FOREIGN PATENT DOCUMENTS

JP    07277615    10/1995

(Continued)

OTHER PUBLICATIONS

B. Powell, "Elevator Planning and Analysis on the Web": ELVCON 2001 Proceeding, published by IAEE (International Association of Elevator Engineer), Jun. 2001, pp. 112-121.

(Continued)

*Primary Examiner*—A. Elamin
(74) *Attorney, Agent, or Firm*—Mattingly, Stanger, Malur & Brundidge, P.C.

(57) ABSTRACT

A specification plan of an order-made product suitable for a building structure plan is generated promptly.

A WWW server 11 and a database server 12 are provided to the equipment designer's side. The database server 12 has a drawing database 9 that registers a CAD symbol for each product. A CAD symbol for each product includes: effective space information, which expresses a space to be secured for installation of the product; product name information expressing a name of the product; structure information expressing structural features (size, shape, etc.); product specification information; option data; etc. On the other hand, WWW server 11 has a symbol generation data interface 3, through which requirements specification data for an order-made product can be received from a WWW client terminal 2, and a CAD symbol of the order-made product can be taken out from the side of the WWW client terminal.

3 Claims, 35 Drawing Sheets

U.S. PATENT DOCUMENTS

| | | |
|---|---|---|
| 6,310,627 B1 * | 10/2001 | Sakaguchi .................. 345/630 |
| 6,397,117 B1 * | 5/2002 | Burrows et al. .............. 700/97 |
| 6,466,953 B1 * | 10/2002 | Bonney et al. ............. 715/502 |
| 6,493,677 B1 * | 12/2002 | von Rosen et al. ........... 705/27 |
| 6,499,006 B1 * | 12/2002 | Rappaport et al. ............ 703/20 |
| 6,859,768 B1 * | 2/2005 | Wakelam et al. .............. 703/1 |
| 6,910,184 B1 * | 6/2005 | Yano et al. ................. 715/526 |
| 6,922,701 B1 * | 7/2005 | Ananian et al. ......... 707/104.1 |
| 6,941,000 B2 * | 9/2005 | Wong ......................... 382/113 |
| 2002/0062339 A1 * | 5/2002 | Carter et al. ................ 709/203 |
| 2005/0055283 A1 * | 3/2005 | Zarovinsky .................. 705/26 |

FOREIGN PATENT DOCUMENTS

| | | |
|---|---|---|
| JP | 09293088 | 11/1997 |
| JP | 10307850 | 11/1998 |

OTHER PUBLICATIONS

S. Isogal, "Downloading Cad Data Through the Internet and Computer Network", Making the Best of Architecture CAD, ed., by Nikkel Architecture, Nikkel Business Publications, Inc., Aug. 1997, pp. 62-69.

Padmaga, Efficient use and standardization of building CAD data, I (Movement toward standardization is an approach to an inherent purpose of CAD), published Jun. 1998, by Kenchiku Chishiki-sya, pp. 177-124.

\* cited by examiner

FIG.2
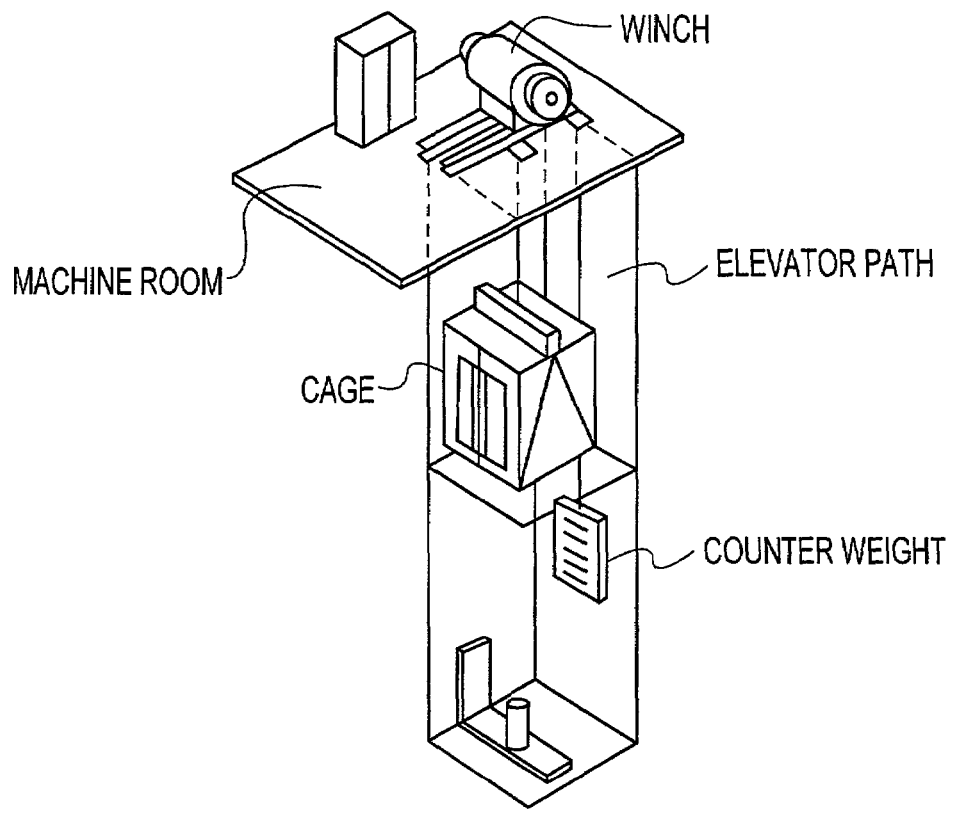
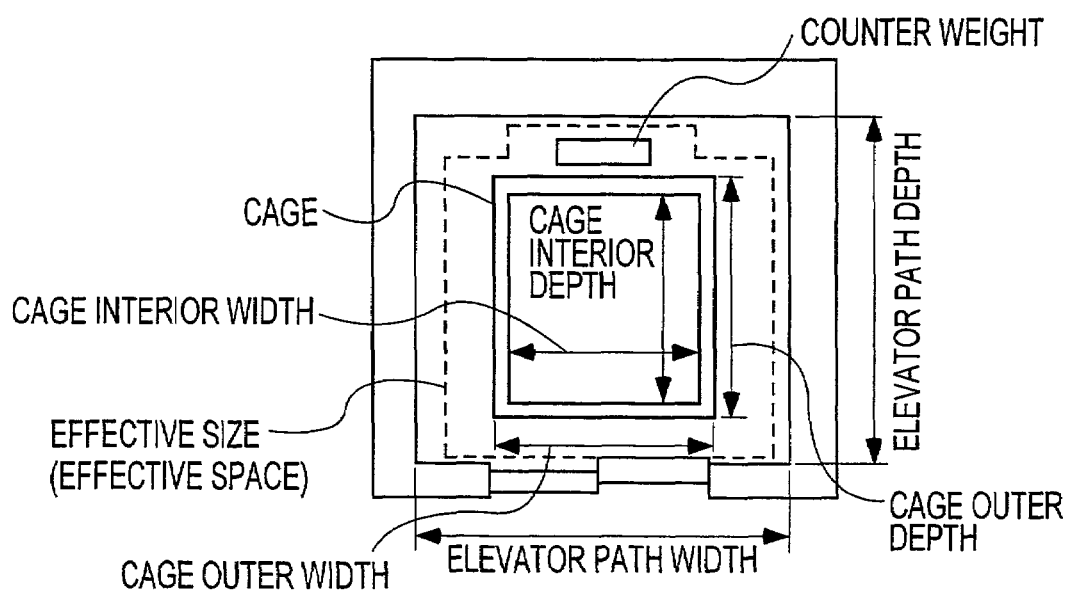
ELEVATOR PATH PLANE

EXAMPLE OF FIXING STRUCTURE

NOTICE OF COMPLETION

BUILDING DESIGN

E-MAIL
"SYMBOL HAS BEEN COMPLETED.
PLEASE ACCESS HTTP://WWW.XXX.CO.JP/ABC/B0001XXX"

TAKING OUT OF SYMBOL

BUILDING DESIGN

| | |
|---|---|
| CASE ID | 00123 — 190 |
| NUMBER OF ELEVATORS : 2 — 191 | PURPOSE OF BUILDING : OFFICE — 192 |
| | NUMBER OF FLOORS : 10 FLOORS — 193 |

1ST ELEVATOR
PASSENGER CAPACITY : 11 PASSENGERS    SPEED : 105m/min
Cwt : REAR WEIGHT POSITION (LEFT)    DOOR OPENING DIRECTION : CENTER OPENING  } 194

2ND ELEVATOR
⋮   ⋮

BUILDING DRAWING DATA UPLOAD   file00123.dxf▼   — 195

DRAWING REQUISITION DATE : 2000 ▼ / 3 ▼ / 30 ▼ — 196

SENDING — 197

(b)

DRAWING GENERATION REQUEST CASE ID : 00123 — 198

DRAWING CAN BE COMPLETED ON OR BEFORE MARCH 30, 2000. — 199

OK — 200

FIG.29
(a)
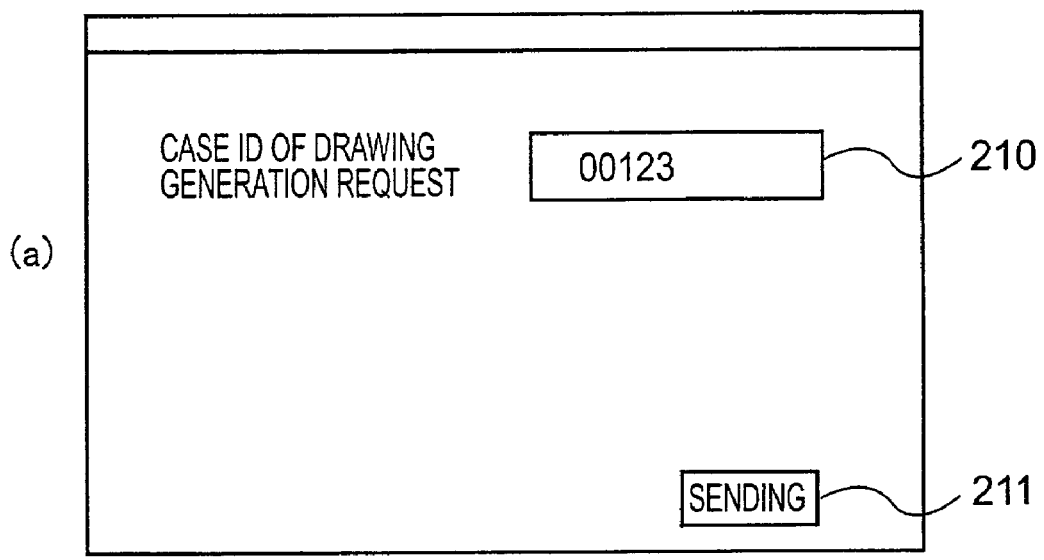
(b)
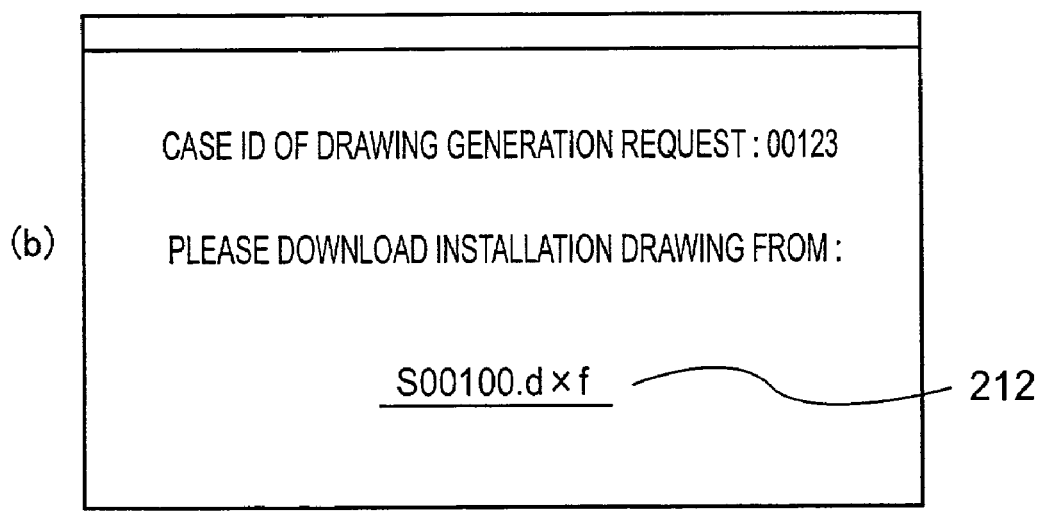

CASE ID : 00123 —220

221— PURPOSE OF BUILDING : OFFICE   NUMBER OF FLOORS : 10 FLOORS —222

1ST ELEVATOR —223
PASSENGER CAPACITY : 11 PASSENGERS   SPEED : 105m/min
DOOR OPENING DIRECTION : CENTER OPENING   Cwt : REAR WEIGHT POSITION (LEFT)

STUDY OF CAGE'S ARTISTIC DESIGN (1) CEILING DESIGN PATTERN

224—

(2) SIDE PLATE MATERIAL

225— DECORATIVE COPPER PLATE (WHITE) / ALUMINUM (3) FLOOR MATERIAL

226— VINYL TILE (BROWN) / MARBLE

228
NECESSARY ☑   UNNECESSARY ☐

(4) HANDRAIL MATERIAL

227— BRASS PIPE

231—
SAVE THE CONTENTS?  Y / N (b)

—232
SAVED WITH CASE ID : 00123    OK
—233

REMOTE ORDER ACCEPTANCE DESIGN SYSTEM AND ELEVATOR REMOTE ORDER ACCEPTANCE METHOD

TECHNICAL FIELD

The present invention relates to a design system for an order-made product and a method of supporting acceptance of an order for an elevator.

BACKGROUND ART

In building processes, usually, a computer-aided design system (hereinafter, called a CAD system) is introduced into each process constituting the building processes. For example, Japanese Unexamined Patent Laid-Open No. 6-89314 describes a system that can be applied to an equipment design process among building processes. This system can quickly design an equipment that satisfies a requirements specification of a building designer.

On the other hand, information is transferred between processes solely by the medium of paper. For example, between a building frame design process and an equipment design process, specifications are usually transmitted and matched (for study of interference between a building and an equipment, and study of equipment fixing structure) on paper.

For transferring CAD data between CAD systems, the "DXF format" that defines an intermediate file format is used as a de facto standard for data exchange. For example, "A sequel to Wise use of a building CAD", published by Nikkei BP, Ltd. August, 1997, pp. 63–69 describes a system in which a constructor or the like obtains CAD symbol data (in the DXF format) of various equipments from the equipment makers' side (equipment designers' side), through Internet, personal computer communication, or the like. According to this system, a building designer can grasp a shape and size of a required equipment quickly and easily, and can make a study of interference whereby it is decided if the equipment can be housed in a building frame under design based on the grasped contents.

DISCLOSURE OF THE INVENTION

In the above-mentioned conventional DXF format, however, data is expressed at the level of graphic elements such as a line segment, an arc, a circle, etc., without giving data expressions corresponding to structural members, for example, a wall, a pillar, a beam, etc., constituting a building. In other words, data only required for making design drawings are transferred, and data required for understanding meanings in the design drawings are not transferred. Thus, for each article of equipment, an equipment designer must understand building structure depicted in a design drawing, and further, must extract features required for determining fixing structures of the article (for example, existence or nonexistence of building elements such as a pillar and a beam, positional relations between the article to be fixed and surrounding building elements, sizes and materials of structural members, and the like) from the design drawings. Accordingly, the equipment designer consumes much time for his work, i.e., for preparing a specification plan of the equipment suitable for a building structure plan of the building designer.

On the other hand, as an industry standard, building product model formats such as IFC (Industrial Foundation Classes), STEP, etc., are going to be established, and interaction between related systems including a CAD system is being realized. A related technique is described in Padmaga, "Efficient use and standardization of building CAD data, I", pp. 117–124, published in June 1998 by Kenchiku Chishikisya. In this technique, a set of objects (a pillar, a wall, a door, etc.) required for model representation is defined as a class library, and access or calculation is performed on objects generated from this class. Such a CAD data exchange technique, which uses standard product models, can exchange definition data of building elements, such as a beam, a pillar, etc., which the above-mentioned DXF format can not exchange.

However, even if such a CAD data exchange technique using standard product models is employed, it nevertheless takes time to prepare an equipment specification plan suitable for a building structure plan of a building designer. The reason is that, in determining fixing structure for an equipment, it is necessary to extract objects related to the equipment out of large-scale building data of complex structure, in order to grasp features (existence or nonexistence of a pillar or a beam, a positional relation between the equipment and the surrounding structural members, etc.) for determining the fixing structure of the equipment, and then, in order to check interference between the equipment and the building structure. Furthermore, a building structure plan is repeatedly changed in the course of design, and it is necessary to check again the interference between the equipment and the changed building structure each time. Such operation requires quickness.

Thus, an object of the present invention is to provide a remote order acceptance design system that can quickly prepare an installation structure plan for suitably installing an order-made article into a building under design. Further, another object of the present invention is to provide a remote order acceptance method that supports processing of order acceptance until an order of a product is successfully accepted.

To attain the above objects, the present invention provides a remote order acceptance design system, comprising:

a database that stores CAD symbols each including effective space information expressing an occupied space occupied by a product;

a first input receiving means for receiving input of a requirements specification of an order-made product that includes one or more equipments;

a data taking means for determining the occupied space of said order-made product based on the requirements specification whose input is received by said first input receiving means, and for taking out a CAD symbol that includes effective space information conforming to said occupied space, from said database; and a data output means for outputting the CAD symbol taken out by said data taking means to an input source who has inputted the requirements specification of said order-made product.

According to the remote order acceptance design system of the present invention, the input source of the requirements specification of the order-made product can obtain a CAD symbol that includes effective space information expressing a space occupied by the order-made product. When building data including this CAD symbol is generated by the input source of the requirements specification of the order-made product, it is possible to detect promptly existence of interference within the occupied space of the order-made product, by calculation processing.

Thus, for example, the remote order acceptance design system according to the present invention may further comprises:

a product specification database that stores one or more pieces of location rule information expressing location rules of the equipments included in the product;

a second input receiving means for receiving input of building data that include a CAD symbol of said order-made product;

a structural features extracting means for extracting structural features within the occupied space expressed by the effective space information of the CAD symbol of said order-made product from the building data received by said second input receiving means, and for judging existence of interference in an installation area of said order-made product, based on said structural features; and an installation drawing generation means for taking out the location rule information corresponding to said CAD symbol from said product specification database, when it is judged that interference does not occur in the installation area of said order-made product, and for generating installation drawing data for said order-made product based on said location rule information and said building data;

and said data output means may output the installation drawing data generated by said installation drawing generation means to an input source who has inputted said building data, when said second input receiving means receives the building data.

In that case, occurrence of interference within the occupied space of the order-made product is promptly checked based on the building data generated in the input source who has inputted the requirements specification of the order-made product. Accordingly, installation drawing data, by which the order-made product can be appropriately installed in the building, can be provided to the input source of the requirements specification of the order-made product, more promptly than the conventional case where interference check is performed by building designer's own judgment. Further, labor of the equipment designer is reduced.

Further, such a remote order acceptance design system may further comprises:

a building data save means for saving the building data received by said second input receiving means, associating said building data with the input source of the building data; and a correction management means for calculating difference between building data after a change and building data before the change, when said second input receiving means receives the building data after the change, and for judging existence of interference in the order-made product's installation area defined by said building data after the change, based on said difference;

and said installation drawing generation means may correct installation drawing data of said order-made product based on said location rule information and said building data after the change, when it is judged that interference does not occur in said order-made product's installation area defined in the building data after the change.

In that case, even if building data is changed repeatedly in the course of design, occurrence of new interference caused by a change in the building data is automatically and promptly checked. Accordingly, labor of the equipment designer is reduced, and at the same time, the input source of the requirements specification of the order-made product can obtain corrected installation drawing data, in shorter time.

Further, to attain the above objects, the present invention provides an elevator remote order acceptance method, in which a computer distributes an elevator installation drawing to a user terminal through a network, wherein:

said method comprises a procedure of making said computer complete said elevator installation drawing step by step, based on data given sequentially from said user terminal; and said procedure comprises one of steps mentioned below, or comprises two or more of said steps in a order mentioned below: namely, a step in which, when said computer receives input of building information relating to a building to be installed with said elevators, through a network, then, information on at least machine types of the elevators, which correspond to said building information, is returned to an input source who has inputted said building information;

a step in which, when said computer receives input of a requirements specification for said elevators, through the network, then, a CAD symbol conforming to said requirements specification is returned to an input source who has inputted said requirements specification; and a step in which, when said computer receives input of building data, which include said CAD symbol, through the network, then, the elevator installation drawing based on said building data is returned to an input source who has inputted said building data.

BRIEF DESCRIPTION OF DRAWINGS

FIG. 2 shows, in an upper part, a view for explaining outline structure of an elevator as an example of an order-made product, and, in a lower part, its cross section;

FIG. 26 is a view showing examples of WWW pages opened on a display screen of a user terminal for a building designer;

FIG. 29 is a view showing examples of WWW pages opened on a display screen of a user terminal for a building designer;

FIG. 32 is a view showing examples of WWW pages opened on a display screen of a user terminal for a building designer;

BEST MODE FOR CARRYING OUT THE INVENTION

Figure 1:
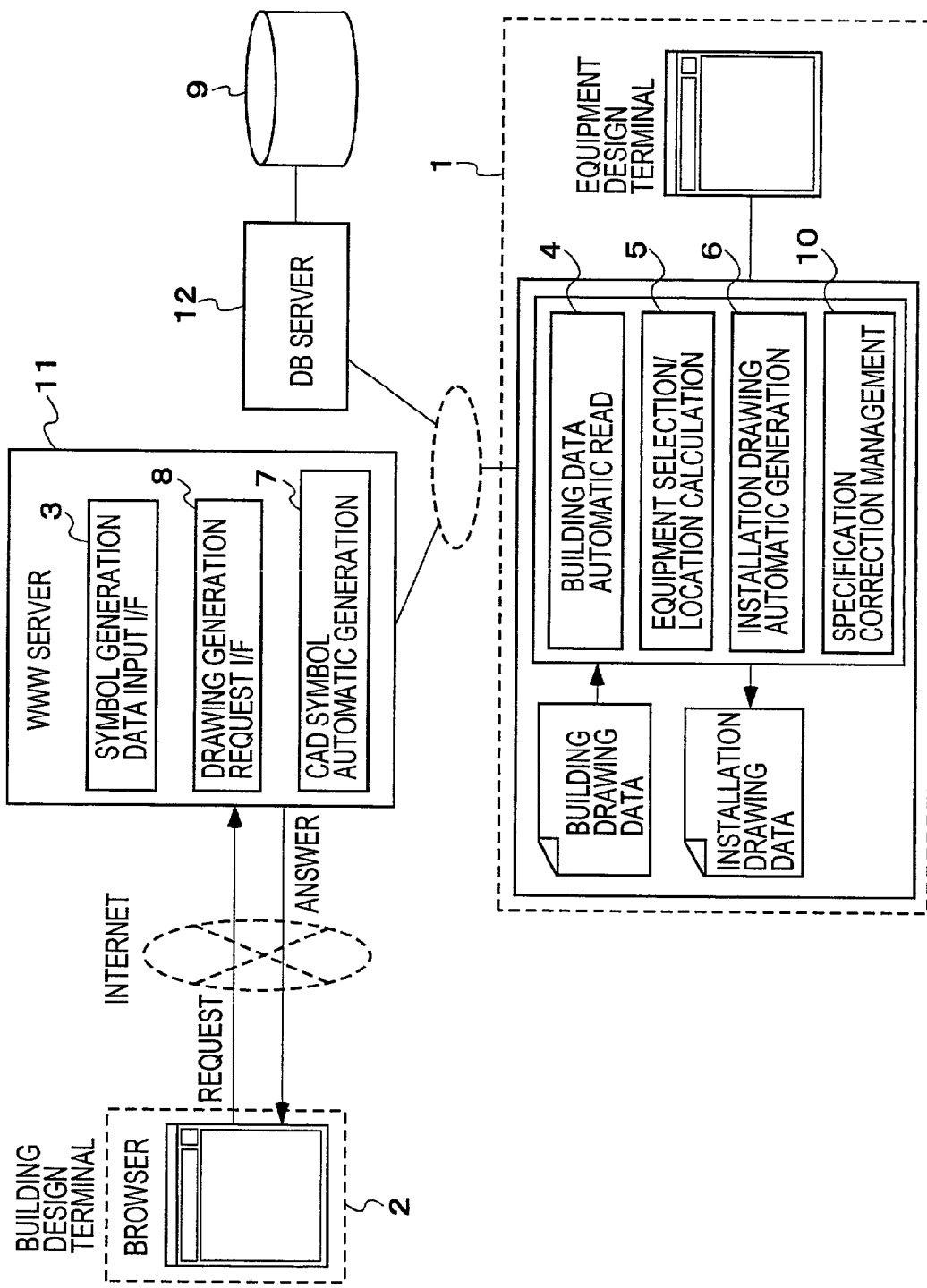
FIG. 1 is a schematic block diagram showing a system according to an embodiment of the present invention.

Now, referring to the attached drawings, an embodiment according to the present invention will be described.

First, referring to FIG. 1, a configuration of a remote order acceptance design system of the present embodiment will be described.

On the side of a building designer, a user terminal 2 as a WWW client connected to a wide area network is installed. This user terminal 2 (hereinafter, referred to as a building designer user terminal 2) has been already installed with a browser required for utilizing WWW, and with a CAD program that supports standard product models.

On the other hand, on the side of an equipment designer, a WWW server 11 connected to the wide area network, a database server 12, and a user terminal 1 (hereinafter, referred to as an equipment designer user terminal 1) are installed. These are connected to one another through LAN.

The WWW server 11 comprises: (1) a symbol generation data interface 3, through which requirements specification data for an order-made product can be received from the building designer user terminal 2, and a CAD symbol of the order-made product can be taken out from the side of the WWW client terminals; (2) an installation drawing generation request interface 8, through which a request for studying installation structure for the order-made product can be received from the building designer user terminal 2, and installation structure data for the order-made product can be received from the side of the WWW client terminals; and (3) a CAD symbol automatic generation processing unit 7 that generates a CAD symbol automatically. Each of these components is a functional component implemented by software such as a CGI program or the like.

The database server 12 is provided with an external storage 9 that stores a drawing database. This drawing database registers a CAD symbol of each product. Each CAD symbol includes: product name information expressing a product name; structure information expressing structural features (size, shape, etc.) of the product; specification information, which includes cage capacity data (passenger capacity and loading capacity) and door opening mode data (center opening, or the like); effective space information expressing a space (hereinafter, referred to as an occupied space) that should be secured for installing the product; option data; and the like.

The equipment designer user terminal 1 comprises functional components implemented by programs read from a hard disk onto a memory. In detail, the equipment designer user terminal 1 comprises: a building data automatic read unit 4, which extracts structural features required for determining the installation structure of the product ordered; an equipment selection/location calculation processing unit 5, which performs an interference check based on the structural features extracted by the building data automatic read unit 4, and thereafter performs selection of component equipments and other operations; an installation drawing automatic generation processing unit 6, which generates installation drawing data based on the processing results by the equipment selection/location calculation processing unit 5; a specification correction management unit 10, which checks interference based on difference between building data before and after a change when the building data are changed; and the like.

Further, the hard disk of the equipment designer user terminal 1 is installed with a CAD program that supports the standard product models, and, in addition, stores a product specification database and structural features database.

The product specification database registers location rule information that expresses installation structure of each product. For example, in the case of an elevator, the location rule information includes: names (cage, winch, etc.) of elevator's component equipments; names (intermediate beam, rail, etc.) of fixing parts for fixing the elevator's component equipments; a series of procedures for strength calculation of fixing structure of the elevator; a table that associates models of elevator's component equipments with respective specifications (width and depth in the case of a cage) of the component equipments; conditional expressions expressing positional relations between the elevator's component units; and the like (see FIG. 14).

Further, the structural features database registers building elements related to installation of an elevator into an elevator shaft, in the below-mentioned elevator shaft relevance building data automatic read processing.

Previous to describing remote order acceptance design processing performed in this system, structure of a rope drive elevator as an example of an order-made product will be described.

As shown in FIG. 2, in a rope drive elevator, a wire rope, which connects a cage with a counter weight, both placed in a vertical elevator shaft, is wound on a winding drum of a winch, and the cage is moved up and down within the elevator shaft by the driving force of the winch. A control panel for controlling the winch etc. is housed inside a machine room provided on a rooftop of a building. Further, on a bottom end of the elevator shaft, there is a safety device such as a shock absorber.

Figure 3:
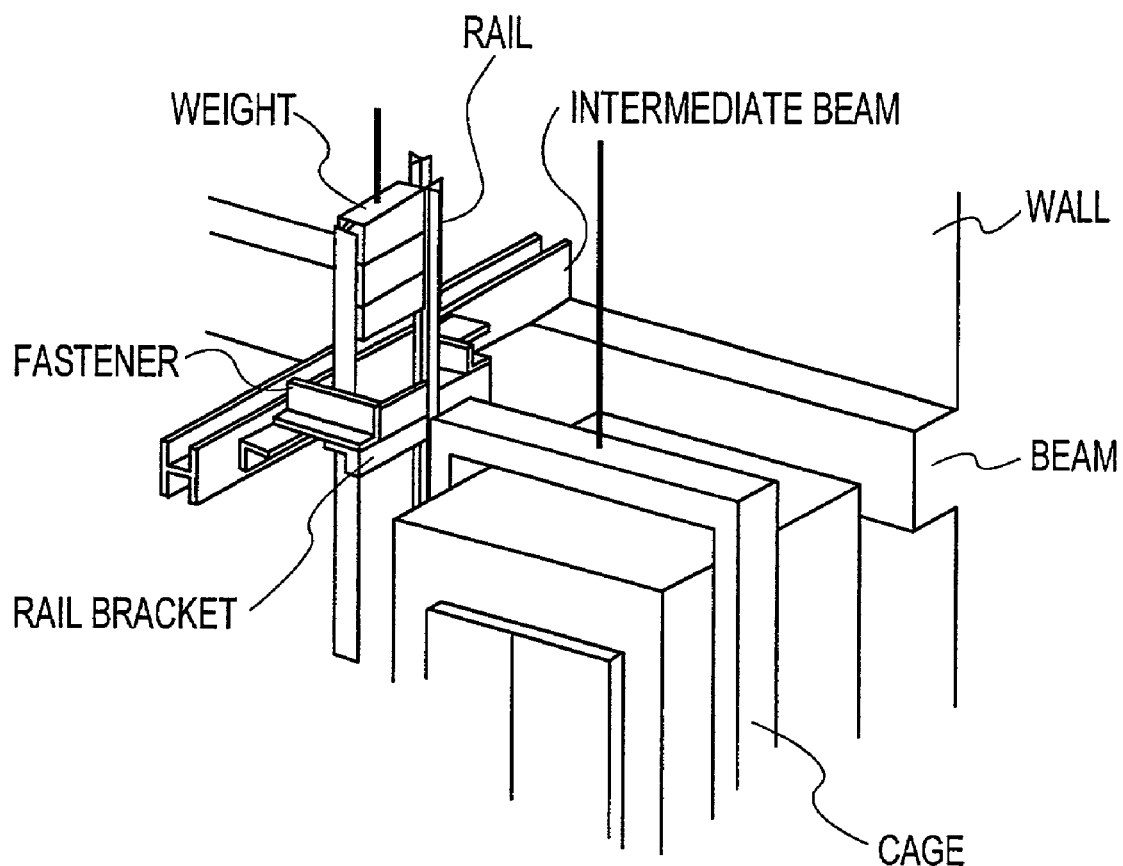
FIG. 3 is a partial view for explaining structure of a fixing part of the elevator.

As shown in FIG. 3, to install such an elevator to a building, an intermediate beam is placed over beams of the building, and rails for guiding the cage and the counter weight are fixed to the intermediate beam by means of a rail bracket. Or, a rail for guiding the cage may be directly fixed to a wall of the building, depending on building structure of the building. Even when a plurality of such elevators are provided in the building, a basic method of installation is not changed, except that a plurality of cages are provided inside an elevator shaft.

Sizes (width and depth) of the elevator shaft should be determined to ensure an occupied space required for installing the mentioned component equipments (cage, rail for guiding the cage, etc.). In examination of interference performed on the side of the equipment designer, it is judged if such sizes of the elevator shaft can be secured, i.e., if the sizes of the elevator shaft are determined such that a pillar or the like does not cut into the occupied space required for installation of the cage etc. that have the sizes satisfying the specifications (passenger capacity, loading capacity, etc.) required by the building designer.

Figure 4:
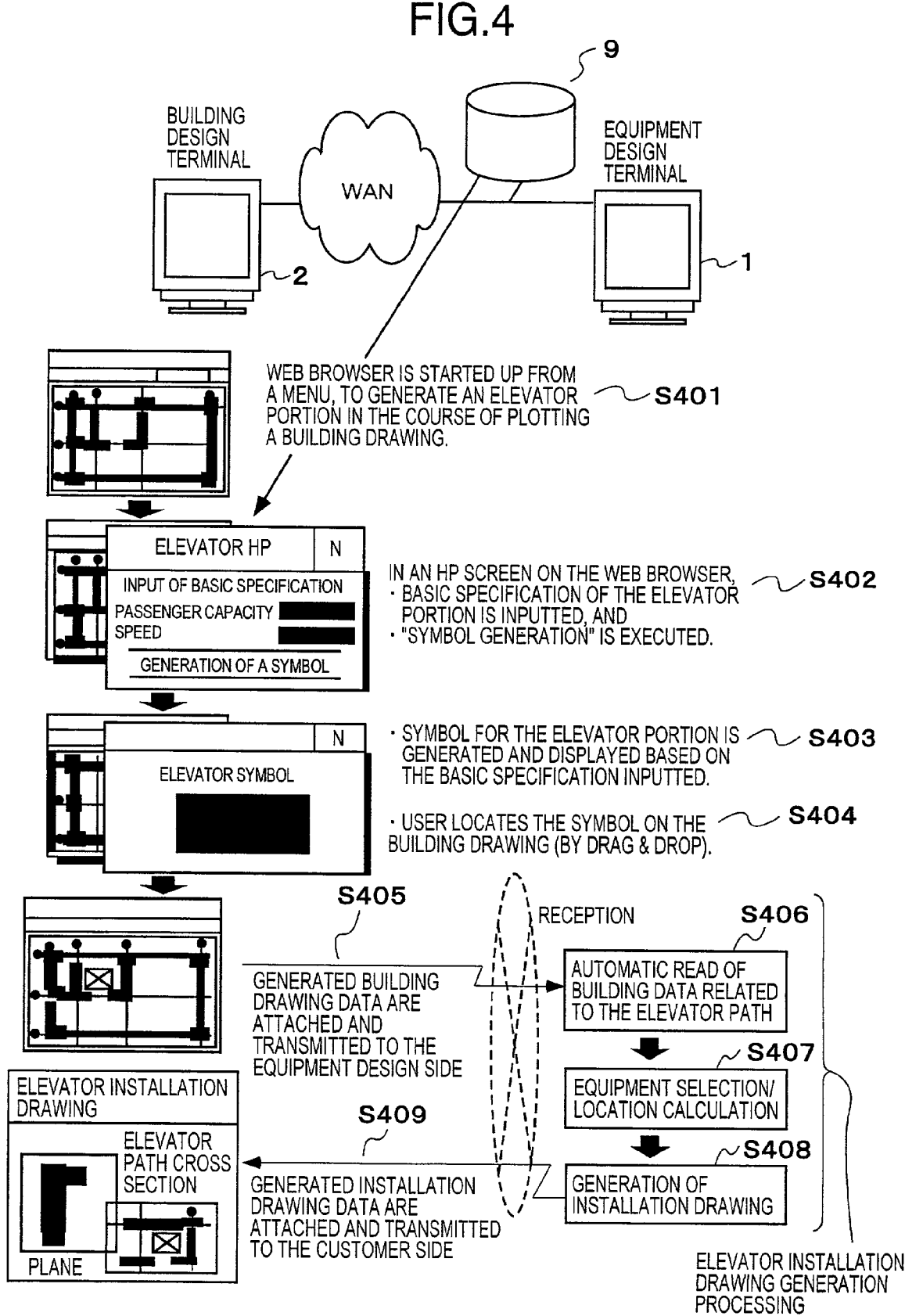
FIG. 4 is a diagram for explaining a flow of remote order acceptance design processing according to one embodiment of the present invention.

Now, thus-described elevator is taken as an example of an order-made product, and, referring to FIG. 4 and other figures (FIGS. 5–11), CAD symbol acquisition processing performed between the building designer user terminal 2 and the WWW server 11 will be mainly described, out of a series of remote processing performed in the system shown in FIG. 1. Here, it is assumed that the building designer starts up the CAD program on the building designer user terminal 2, and designs a building with elevators, on a CAD window activated by the starting up.

The building designer designing a building with elevators must study fitting of the elevators, in the course of design. For that purpose, the designer should know sizes of an elevator shaft required for installation of the elevators, and know if the elevators can be housed in the elevator shaft in a design drawing.

Figure 5:
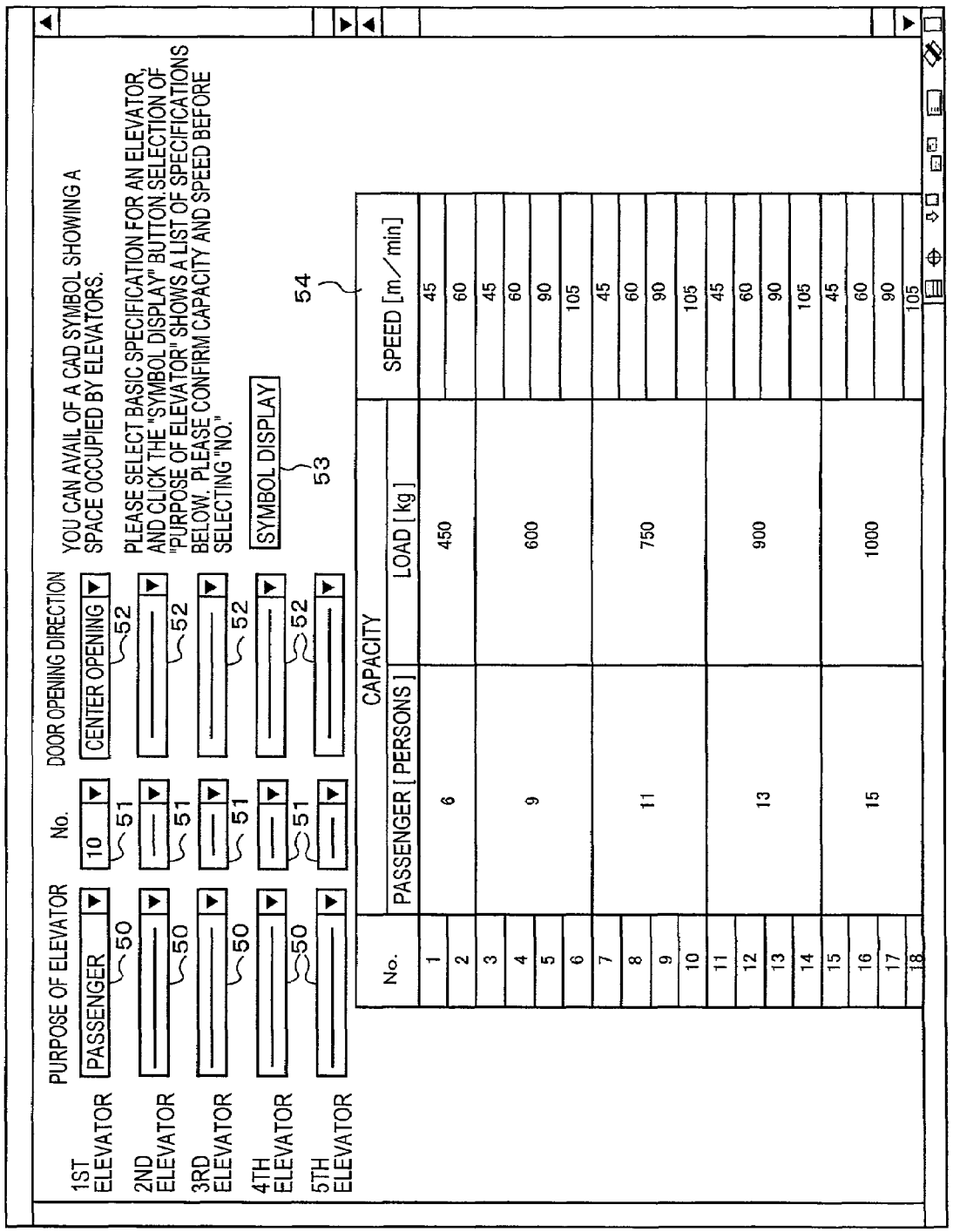
FIG. 5 is a view showing a display example of a GUI employed in a user terminal for a building designer.

In such a case, when the building designer starts up a browser on the building designer user terminal 2, then, connection between the building designer user terminal 2 and the WWW server 11 is established, and an elevator design WWW page as shown in FIG. 5 is opened (S401). This elevator design WWW page includes, for each elevator: an elevator purpose input box 50 for receiving input of a purpose of the elevator; a specification number input box 51 for receiving input of designation of a basic specification of the elevator; and a door opening direction input box 52 for receiving input of a door opening mode of the elevator. Thus, the building designer should input suitable data into the input boxes 51, 52 and 53 for each of the elevators to be installed. On this elevator design WWW page, when a purpose of an elevator is inputted into an elevator purpose input box, then, a list 54 of basic specifications of elevators used for the designated purpose is displayed. In detail, an information list is displayed, showing correspondence relationship between a cage capacity (passenger capacity and loading capacity) and an ascension/descending speed. Thus, the building designer can select a suitable basic specification out of the list, and input a number of the selected specification into the specification number input box. Here, options such as existence of a trunk, a counter weight position, etc. may be selected additionally on this elevator design WWW page.

When the designer clicks a symbol display button 53 at the end of setting basic specification data etc. for each of the number of elevators required, then, a CAD symbol retrieval request, which includes the basic specification data and the door opening direction data, is sent to the WWW server 11 (S402).

Receiving this CAD symbol retrieval request, the WWW server 11 extracts the basic specification data and the door opening direction data from the received data. The extracted data are stored as requirements specification data into a buffer memory. At the same time, the WWW server 11 makes a request to the database server 12 for database retrieval using the basic specification data of the requirements specification data, as a retrieval key.

At that time, processing of the request received by the database server 12 is performed by execution of the CGI program (see FIG. 7) read onto the memory.

The database server 12 searches the drawing database, to retrieve a CAD symbol that includes the basic specification data designated as the retrieval key, from the drawing database, and returns the retrieved CAD symbol to the WWW server 11. At that time, when the database retrieval is unsuccessful, then, the database server 12 answers the WWW server 11 to that effect.

Receiving the return data from the database server 12, the WWW server 11 performs the following processing depending on the return data.

Figure 6:
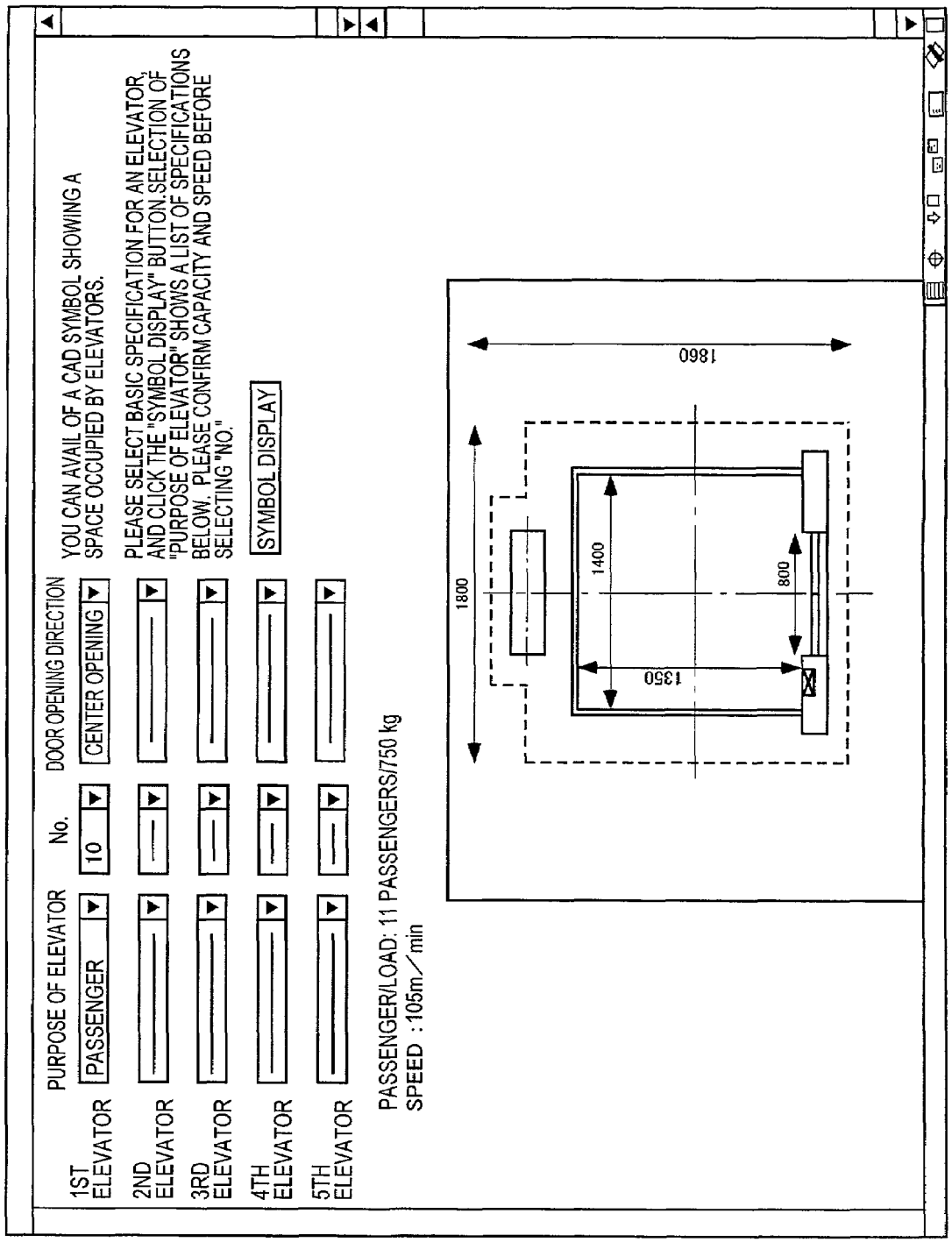
FIG. 6 is a view showing a display example of a GUI employed in a user terminal for a building designer.
Figure 7:
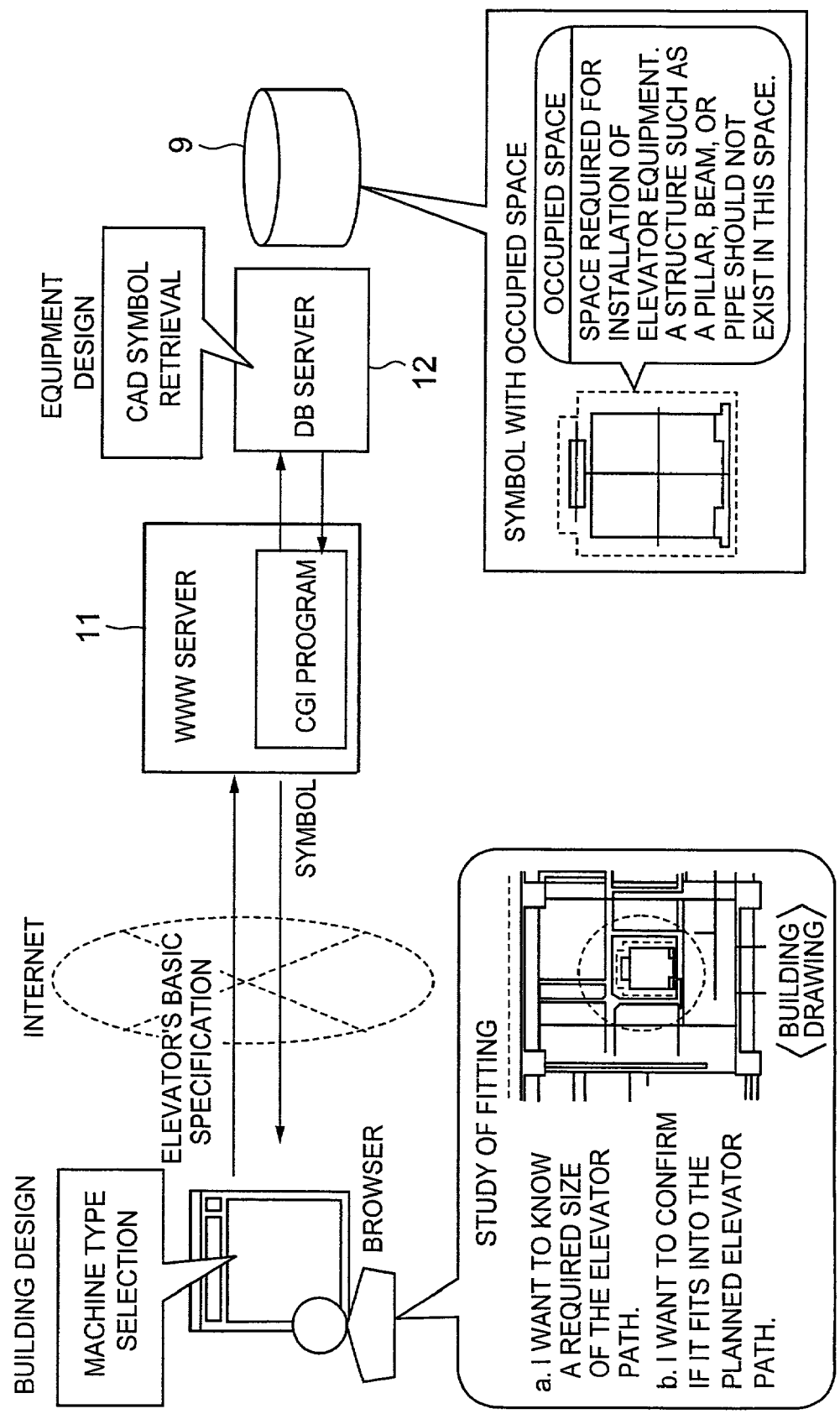
FIG. 7 is a diagram showing a flow of data in remote order acceptance design processing according to one embodiment of the present invention.
Figure 8:
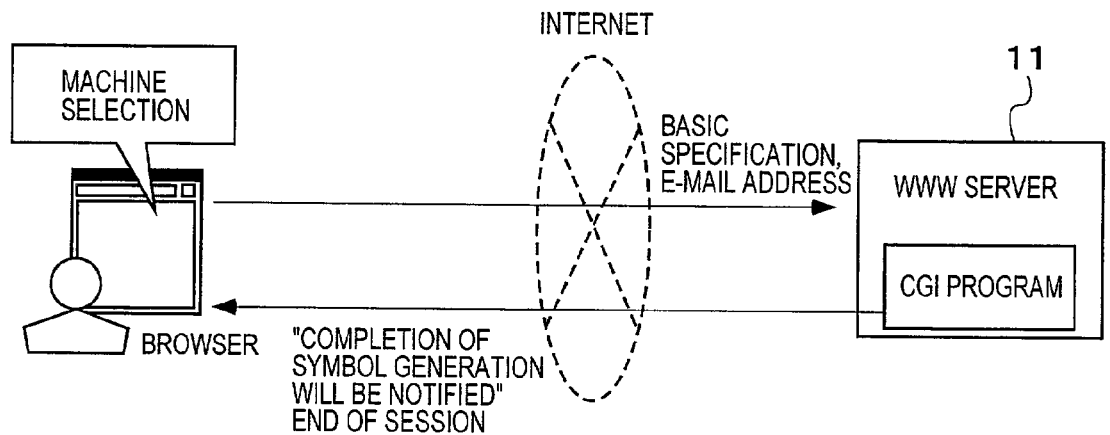
FIG. 8 is a diagram showing a flow of data in remote order acceptance design processing according to one embodiment of the present invention.

When a CAD symbol is included in the return data, then, the WWW server 11 sends the CAD symbol as an answer to the input of the basic specification data etc., to the building designer user terminal 2 (see FIG. 7). By this, as shown in FIG. 6, this CAD symbol (i.e., the structure and effective space of an elevator conforming to the specification required by the building designer) is displayed as a parametric representation on the elevator design WWW page of the building designer user terminal 2. FIG. 6 shows a CAD symbol of one elevator, as an example of display. However, when the building designer has set basic specifications etc.

for a plurality of elevators, then, a CAD symbol of the plurality of elevators (i.e., structure and effective space of an aggregation of the plurality of elevators) is displayed as a parametric representation.

On the other hand, when a message that the database retrieval is unsuccessful is included in the return data, then, the WWW server 11 makes a message displayed on the elevator design WWW page of the building designer user terminal 2 to the effect that an e-mail will be sent at the end of generation of a CAD symbol conforming to the requirements specification to report a storage location of the CAD symbol. In addition, the WWW server 11 requests input of a mail address as a destination for the e-mail message. When an answer to this request is received, then, the WWW server 11 once disconnects it from the building designer user terminal 2 (see FIG. 8).

Then, the CAD symbol automatic generation processing unit 7 converts the basic specification data designated by the building designer into geometry (a shape and size of the cage, a shape and size of the counter weight, etc.) of each component part of the elevator according to a predetermined rules, and further, sets an occupied space around the assembly of those component parts according to their sizes. Further, using the determined occupied space and geometry of each component unit, and the product name information, the requirements specification data, etc., the CAD symbol automatic generation processing unit 7 generates a CAD symbol that includes the predetermined information (the product name information, structure information, specification information, effective space information, option data, and the like) (S403).

Figure 9:
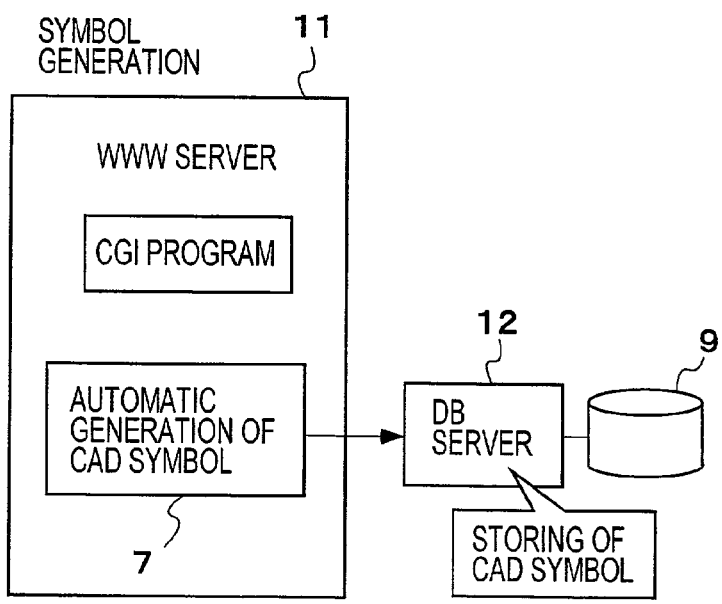
FIG. 9 is a diagram showing a flow of data in remote order acceptance design processing according to one embodiment of the present invention.
Figure 10:
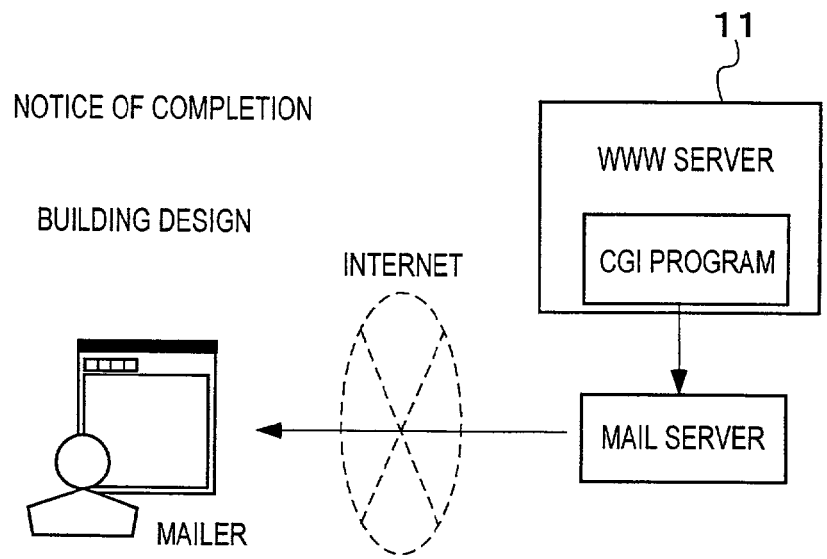
FIG. 10 is a diagram showing a flow of data in remote order acceptance design processing according to one embodiment of the present invention.
Figure 11:
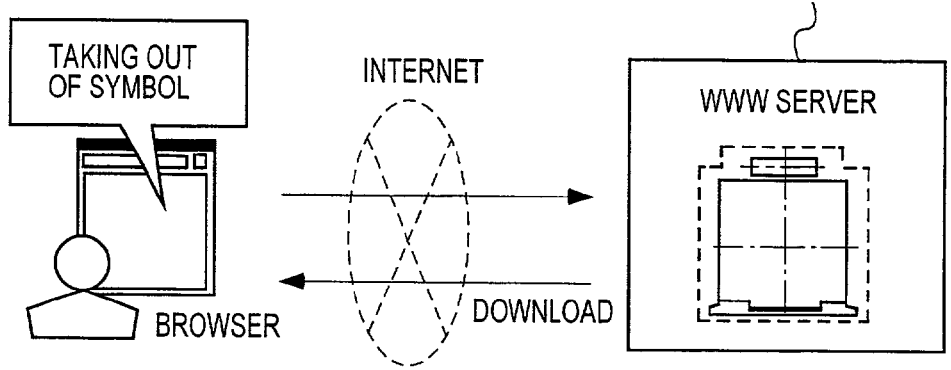
FIG. 11 is a diagram showing a flow of data in remote order acceptance design processing according to one embodiment of the present invention.

Thereafter, the WWW server 11 requests the database server 12 to register the newly-generated CAD symbol, and requests a mail server on the network to send an e-mail addressed to the building designer to inform him of the completion of the CAD symbol and its storage location (see FIGS. 9 and 10). Here, each processing of requesting the database server 12 or the mail server is performed by executing a CGI program read onto the memory.

When the building designer knows the completion and storage location of the CAD symbol by means of an arrival of the e-mail from the WWW server 11 and downloads the CAD symbol from the storage location (see FIG. 11), then, the CAD symbol (i.e., the structure and effective space of the elevator conforming to the specification required by the building designer) is displayed as a parametric representation on the elevator design WWW page of the building designer user terminal 2.

Only by drag and drop of the CAD symbol from the elevator design WWW page and by placing the CAD symbol in the design drawing in progress on a CAD window, the building designer can ascertain at a glance if the elevator satisfying the requirements specification interferes with the surrounding building elements (S404). For example, when the occupied space shown by the effective space information of the CAD symbol overlaps a surrounding building element (a pillar, a wall, or the like), then, the building designer judges that the elevator satisfying the requirements specification by himself can not be housed in the elevator path in the building design drawing. Thus, the building designer can recognize that at least one of the requirements specification of the elevator and the size of the elevator shaft in the building design drawing in progress should be changed. For example, when it is judged that the requirements specification of the elevator should be changed, then, the building designer makes a suitable change in the requirements specification to repeat the processing similar to the above until a suitable CAD symbol is obtained.

When it is judged that the elevator satisfying the requirements specification does not interfere with the surrounding building elements, or that interference between the elevator satisfying the requirements specification and the surrounding building elements is avoided by modifying the building drawing, then, the equipment designer (the elevator designer) performs elevator installation drawing generation processing on the building designer user terminal 1 of himself. In the following, this elevator installation drawing generation processing will be described referring to FIG. 4 and other reference drawings (FIGS. 12–15).

The building designer sends building drawing data that includes the CAD symbol from the building designer user terminal 2 to the equipment designer user terminal 1 (S405). When the equipment designer confirms reception of this sent data, and thereafter inputs an execution command for starting the installation drawing generation processing through an input unit (keyboard, mouse, or the like), then, the following processing is executed sequentially on the equipment designer user terminal 1.

(1) Elevator Shaft Relevance Building Data Automatic Read Processing (S406)

First, the building data automatic read unit 4 derives the building drawing data from the data sent from the building designer user terminal 2, and extracts building elements relating to elevator's installation in the elevator shaft (in detail, pillars, walls and beams that may project into the elevator shaft) as characteristic structure, for each floor of the building.

Figure 12:
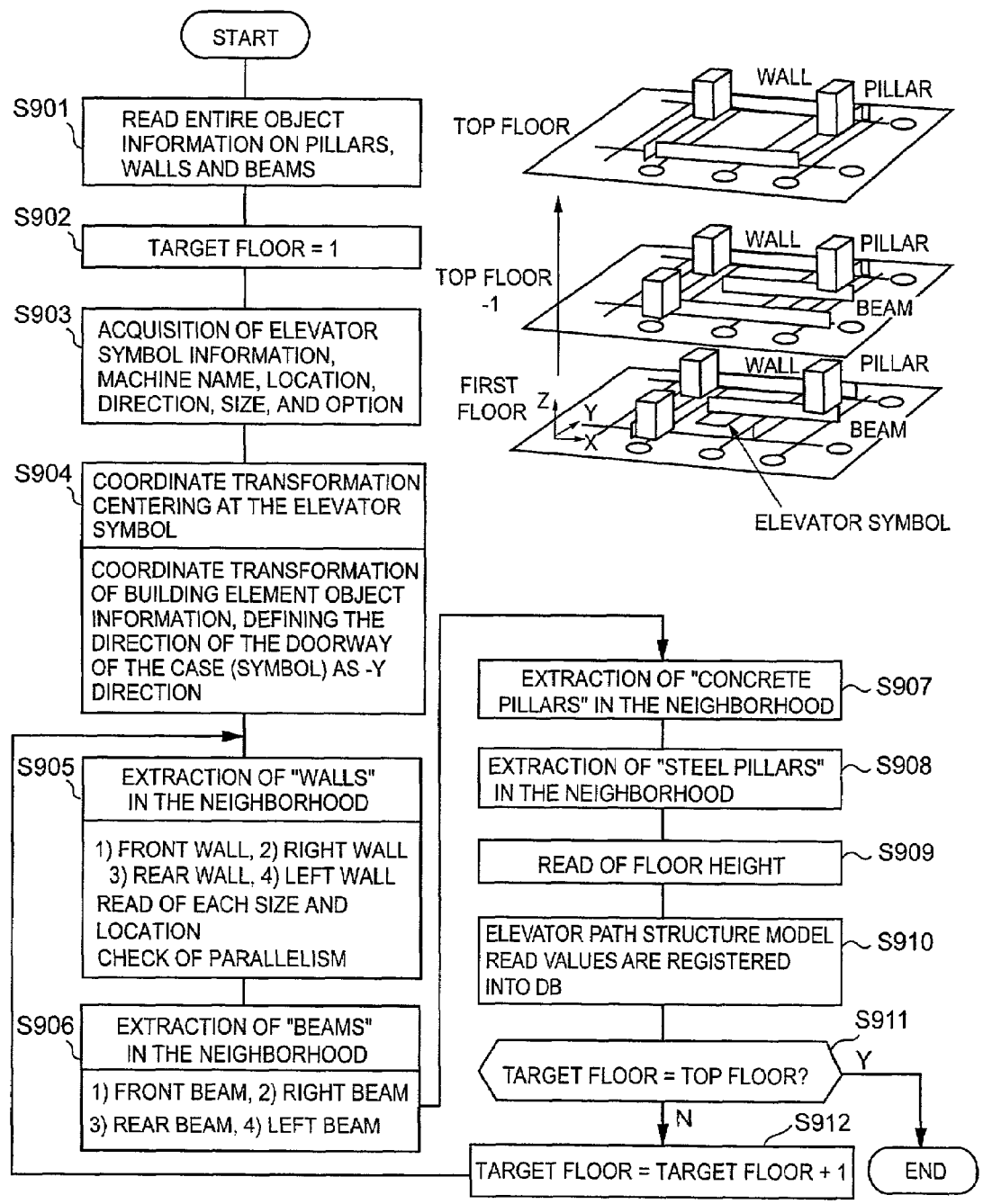
FIG. 12 is a flowchart showing elevator shaft relevance building data automatic read processing, which is performed by a building data automatic read unit.

In detail, as shown in FIG. 12, the building data automatic read unit 4 extracts all objects of three kinds of building elements, pillar, beam and wall from the building drawing data (S901). Then, taking this group of objects as the population, the building data automatic read unit 4 extracts objects that exist in the neighborhood of the CAD symbol out of the population, for each floor of the building. In detail, this is performed as follows.

The building data automatic read unit 4 initializes an target floor parameter (S902), and then, derives various kinds of information included in the CAD symbol (S903).

Then, the building data automatic read unit 4 calculates the location and direction of the CAD symbol in the building drawing (S904). Further, a new rectangular coordinate system is defined such that the location of the CAD symbol becomes the origin and the frontward direction of the CAD symbol is −Y direction. And, the coordinate system on the building drawing is transformed into this new rectangular coordinate system. By this operation, coordinates of the above-mentioned objects are transformed into coordinates in the new coordinate system.

Then, the building data automatic read unit 4 extracts wall objects on the four sides of the CAD symbol out of the wall objects that are included in the above-mentioned group of objects and belong to the target floor (S905). At the same time, the building data automatic read unit 4 checks parallelism of the CAD symbol with the wall objects on its four sides. When the CAD symbol is inclined in relation to the wall objects on the four sides, then, all the objects of the target floor in the building drawings are rotationally transferred by a rotation angle corresponding to the inclination. This corrects an error in the building drawing owing to the drag and drop placement of the CAD symbol onto the building drawing.

Further, the building data automatic read unit 4 extracts beam objects on the four sides of the CAD symbol out of the beam objects that are included in the above-mentioned group of objects and belong to the target floor (S906). Similarly, concrete pillar objects adjacent to the CAD symbol out of the pillar object that are included in the above-mentioned group of objects and belong to the target floor are extracted (S907), and further, steel pillar objects adjacent to the CAD symbol are extracted (S908). Then, after calculation of the floor height of the target floor (S909), the record of the above-described calculation processing performed with respect to the target floor is outputted as a log file, and association information, which associates the result of the above-described calculation processing performed with respect to the target floor with building drawing identification information (for example, a user name of the building designer, etc.), is stored into the structural features database (S910). The log file can be referred to at any time for the sake of working convenience of the building designer.

Thereafter, the building data automatic read unit 4 judges if the target floor is the top floor of the building (S911). If not, the target floor parameter is incremented by one (S912), and the processing is repeated from S905.

(2) Equipment Selection/Location Calculation Processing (S407)

When the processing S905–S910 is performed for each floor up to the top floor in the elevator shaft relevance building data automatic read processing (S406), then, the equipment selection/location calculation processing unit 5 gets elevator location rule information out of the product specification database, to perform equipment selection/location calculation processing using the obtained information.

Figure 14:
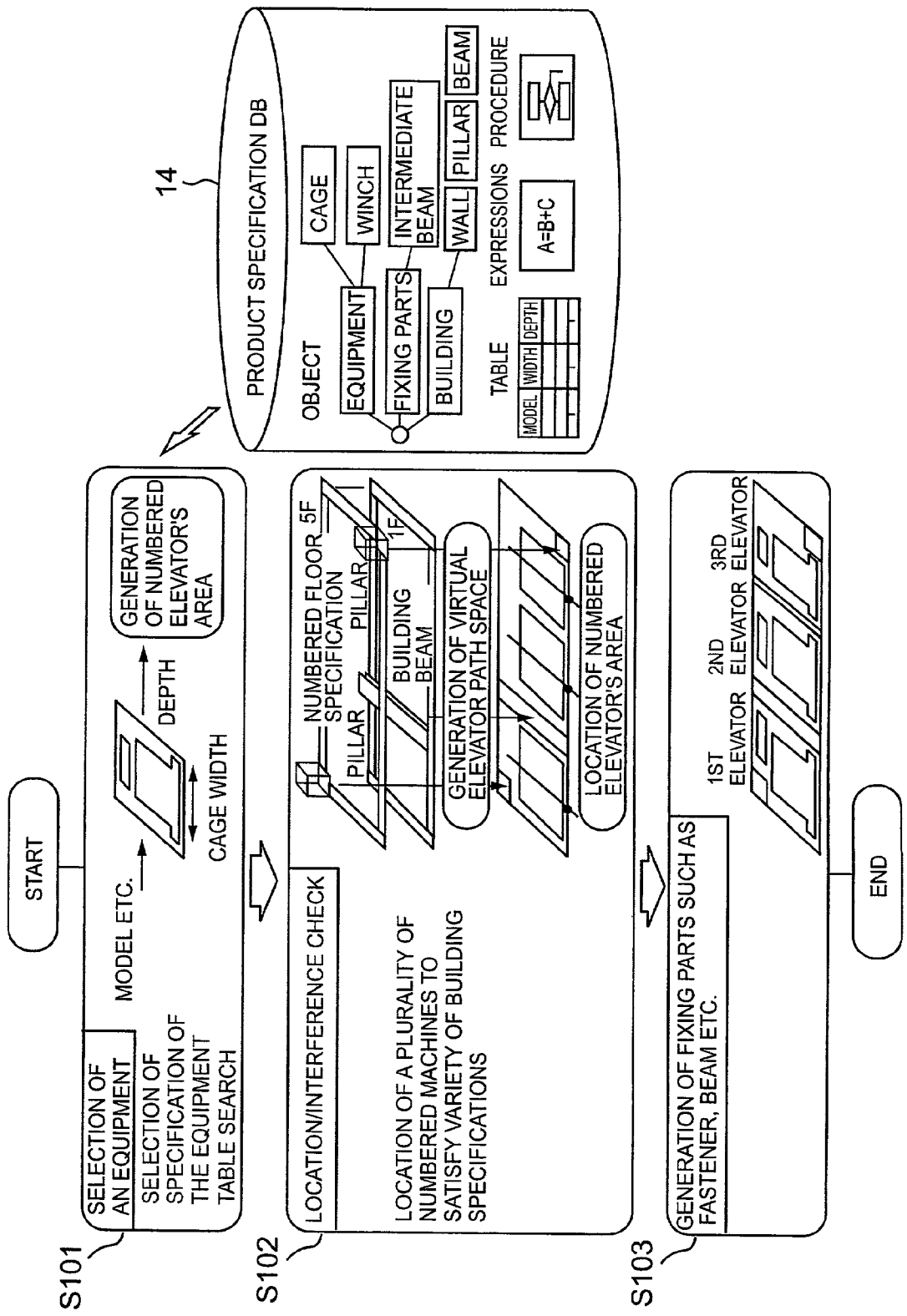
FIG. 14 is a flowchart showing processing of equipment selection/location calculation, which is performed by an equipment selection/location calculation processing unit.

In detail, as shown in FIG. 14, the equipment selection/location calculation processing unit 5 gets the elevator location rule information out of the product specification database, and determines models of elevator's component units according to a correspondence relation defined in the table included in the location rule information. For example, in the case of a cage of the elevator, a model associated with the cage size included in the CAD symbol is determined as an accepted model (S101). In the case where the CAD symbol represents a plurality of elevators, models etc. of elevator's component units are determined for each elevator, according to the location rule information.

Then, the equipment selection/location calculation processing unit 5 locates the elevator's component units according to the location rule information. In detail, strength calculation is performed according to the procedures included in the location rule information. And, a component unit that has not been located is located such that the component unit in question and the already-located component units have positional relations satisfying the conditional expressions included in the location rule information. In the case where the CAD symbol represents a plurality of elevators, locations of the component units are determined for each elevator, according to the location rule information.

Further, the equipment selection/location calculation processing unit 5 judges if each object extracted as characteristic structure by the building data automatic read unit 4 cuts into the space occupied by the elevator which is defined on the building drawing (S102).

When no object cuts into the space occupied by the elevator, then, the equipment selection/location calculation processing unit 5 judges that the elevator does not interfere with the surrounding building elements, and locates the component units (cage, winch, etc.) whose names are included in the location rule information, at their predetermined locations, and further, locates the fixing parts (intermediate beam, fastener, etc.) whose names are included in the location rule information at their predetermined locations.

On the other hand, when there is an object that cuts into the space occupied by the elevator, then, the equipment selection/location calculation processing unit 5 requests the mail server on the network to send an e-mail addressed to the building designer to inform him to the effect that the elevator interferes with the surrounding building elements. From the arrival of this e-mail, the building designer can recognize that the elevator interferes with the surrounding building elements, and thus, he can promptly start considering a change of the building drawing data in the course of designing.

The building designer, who has received an e-mail informing him of the interference between the elevator and the surrounding building elements, must correct the building drawing to obtain installation drawing data. When the building designer sends the corrected building drawing data from his user terminal 2 to the equipment designer user terminal 1, then, the building data automatic read unit 4 extracts characteristic structure from the building drawing data, similarly to the above-described case. However, in the present case, after the extraction of the characteristic structure, the specification correction management unit 10 calculates difference between the characteristic structure extracted this time and the characteristic structure extracted last time (i.e., characteristic structure data stored in the structural features database, and checks interference, only with respect to objects corresponding to the difference. When there is no interference, the equipment selection/location calculation unit 5 performs processing similar to the above-described equipment selection/location calculation processing (S407), and then, the installation drawing automatic generation processing unit 6 performs processing similar to the above-described installation drawing generation processing (S408), to complete the installation drawing data.

Thus, even if the building drawing data is changed in the course of design, generation of new interference owing to a change of the building drawing data is promptly and automatically checked. And thus, labor of the equipment designer is reduced and equipment designer's time required for obtaining installation drawing data is shortened.

The building designer, who has received an e-mail informing him of the interference between the elevator and the surrounding building elements, must correct the building drawing to obtain installation drawing data. When the building designer sends the corrected building drawing data from his user terminal 2 to the equipment designer user terminal 1, then, the building data automatic read unit 4 extracts characteristic structure from the building drawing data, similarly to the above-described case. However, in the present case, after the extraction of the characteristic structure, the specification correction management unit 10 calculates difference between the characteristic structure extracted this time and the characteristic structure extracted last time (i.e., characteristic structure data stored in the structural features database, and checks interference, only with respect to objects corresponding to the difference. When there is no interference, the equipment selection/location calculation unit 5 performs processing similar to the above-described equipment selection/location calculation processing (S407), and then, the installation drawing automatic generation processing unit 6 performs processing similar to the above-described installation drawing generation processing (S408), to complete the installation drawing data.

Thus, even if the building drawing data is changed in the course of designing, generation of new interference owing to a change of the building drawing data is promptly and automatically checked. And thus, labor of the equipment designer is reduced and equipment designer's time required for obtaining installation drawing data is shortened.

(3) Installation Drawing Generation Processing (S408)

Figure 15:
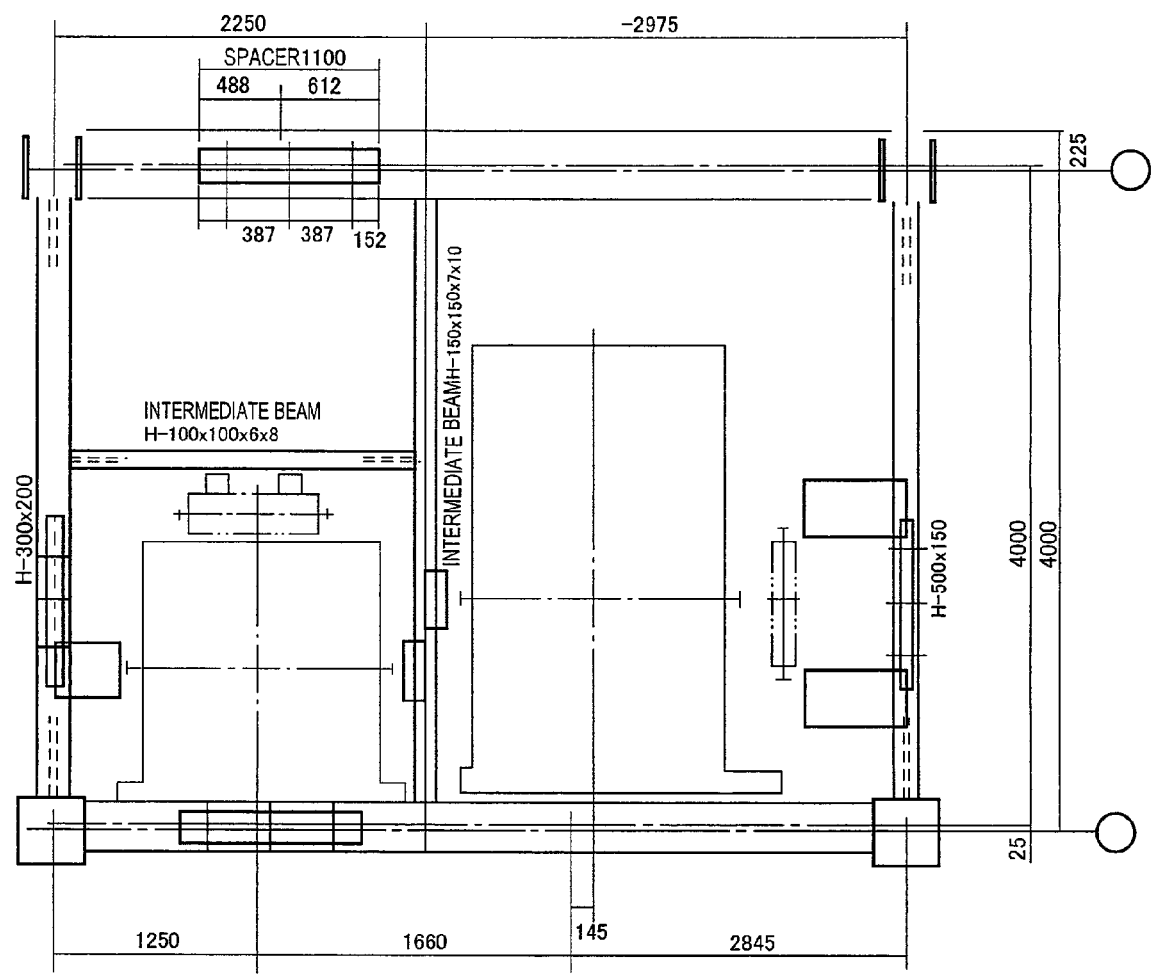
FIG. 15 is a view showing an example of an elevator installation drawing generated by elevator installation drawing generation processing performed by a user terminal on the side of the equipment designer.

When the locations of the fixing parts are determined in the equipment selection/location calculation processing (S407), then, the installation drawing automatic generation processing unit 6 performs installation drawing generation processing based on the data obtained in the equipment selection/location calculation processing (S407). In detail, the elevator's component units and fixing parts are placed in the building drawing at their locations determined by the result of the equipment selection/location calculation processing. For example, when it is scheduled to install three elevators in the building, execution of this installation drawing generation processing generates an installation drawing as shown in FIG. 15. Then, the building drawing data are sent as installation drawing data to the sender of the original building drawing (S409).

Figure 13:
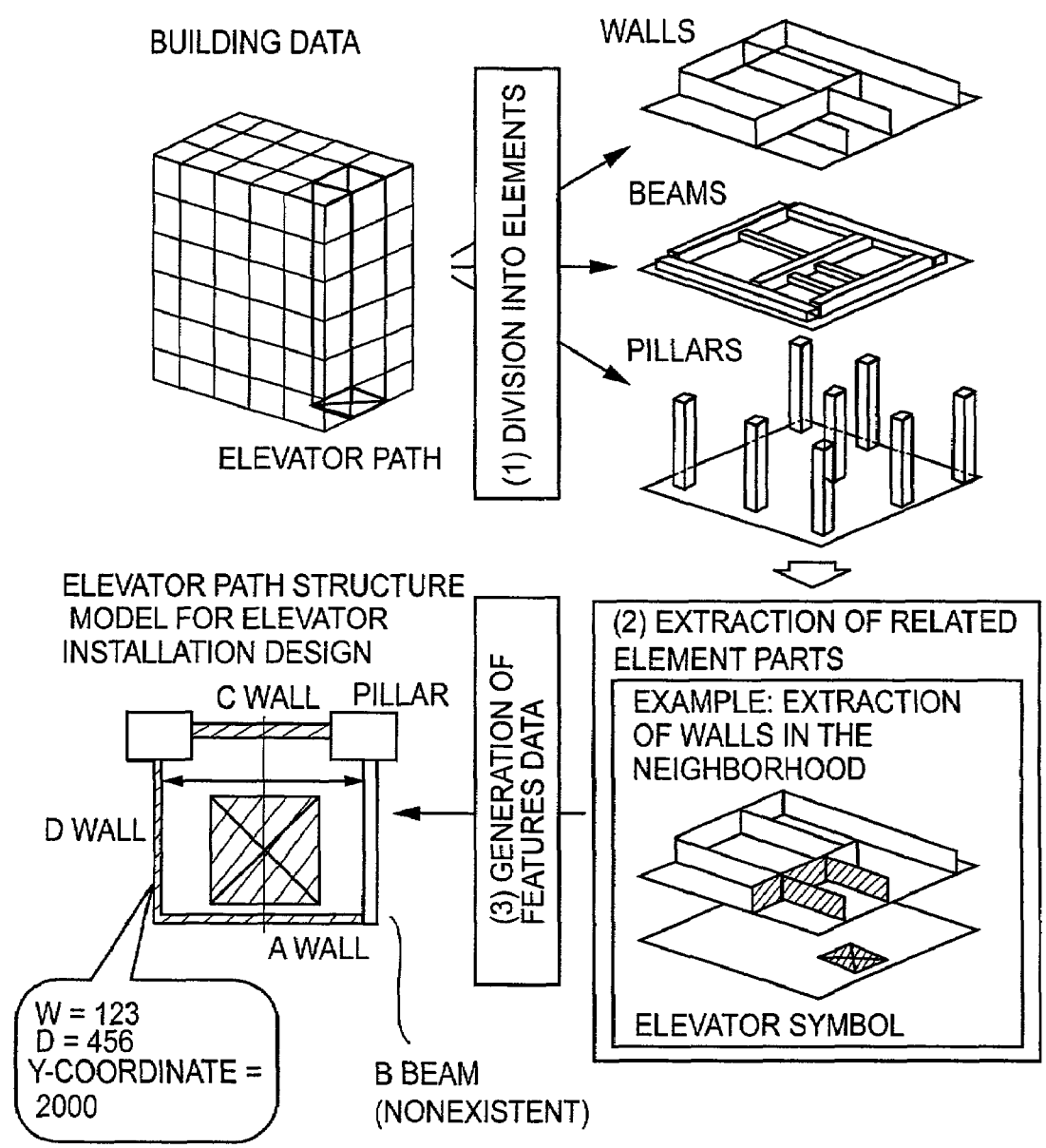
FIG. 13 is a schematic view showing processing of generating an elevator installation drawing, which is performed by a user terminal on the side of an equipment designer.

According to the above-described installation drawing generation processing, existence of interference in the occupied space of the elevator is promptly and accurately checked by the calculation processing. Thus, it is possible to provide installation drawing data, which can ensure suitable installation of an elevator in a building, more promptly to a building designer than the case where the building designer checks interference on his own judgement. And, it is possible to satisfy building designer's desire of early grasping of installation structure. Further, labors of an equipment designer is reduced also. FIG. 13 shows concisely the flow of the installation drawing generation processing.

When the above-described network system is extended, it is possible to provide more diversified services to an equipment designer. In the following, this extended system will be described, stressing different points from the above-described system.

Figure 16:
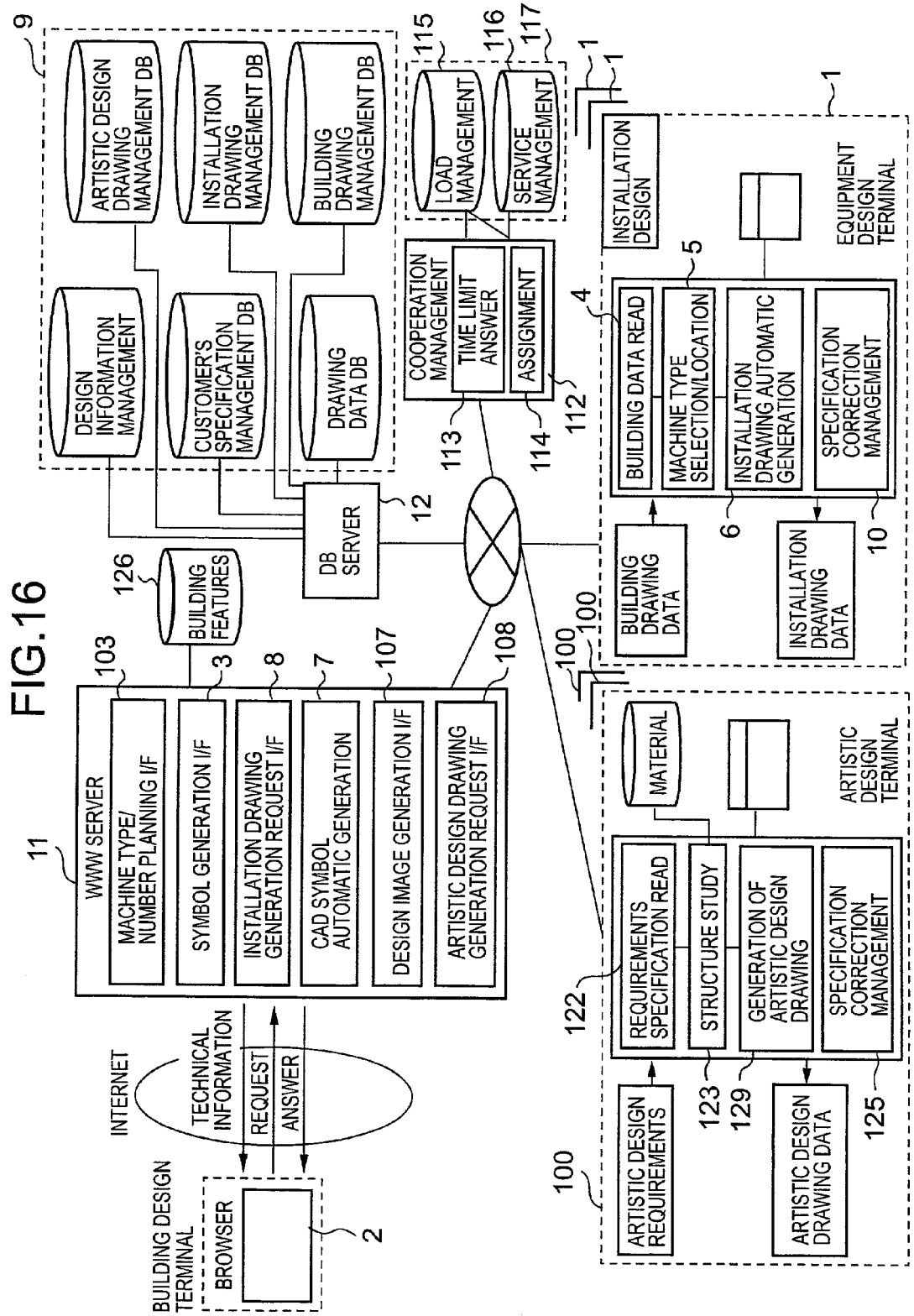
FIG. 16 is a schematic block diagram showing a system according to an embodiment of the present invention.

As shown in FIG. 16, on the side of the equipment designer in this case, are installed a management terminal 112, a plurality of user terminals 1, 100, in addition to the above-mentioned WWW server 11 and database server 12. Similarly to the above-described case, these are connected to one another through LAN.

Among the plurality of user terminals 1, 100, there exist at least one of the above-described equipment designer user terminal 1 and at least one user terminal 100 (hereinafter, referred to as an artistic designer terminal 100) having a new function.

This artistic designer user terminal 100 comprises: (1) a requirements specification read unit 122, which requests the database server 12 to retrieve a design information file etc.; (2) a structure study processing unit 123, which determines elevator interior decoration structure based on the design information file, etc.; (3) an artistic design drawing generation processing unit 124, which generates elevator artistic design drawing data etc. based on a result of determination by the structure study processing unit 123; (4) a specification correction management unit 125, which calculates difference between artistic design requirements specifications before and after a change when it is requested to change the elevator artistic design drawing data; and the like; as functional components implemented by CPU and software read from a built-in hard disk onto a memory.

Further, the built-in hard disk of the artistic designer user terminal 100 is installed with a CAD program for standard product models. In addition, the artistic designer user terminal 100 stores a material database. This material database registers product specification information that indicates product specifications (shape, size, quality, function, etc.) of each interior material of order-made product. For example, in the case of a decorative steel plate used as a side plate material for an elevator cage, length, width, and the like of a decorative steel plate marketed as a product are registered as product specification information.

Then, the management terminal 112 comprises: (i) a time limit answer processing unit 113, which estimates the dead line on the equipment designer's side; (ii) a post assignment processing unit 114, which assigns a drawing generation request from a building designer to individual persons in charge of the design; and the like; as functional components implemented by CPU and software read from a built-in hard disk onto a memory. Further, an external storage 117 of the management terminal 112 stores two databases 115 and 116 for storing data required for executing processing by each processing unit 113, 114. One database 115 (a load management database) registers, for each person in charge of the design, identification information (name, ID number, mail address, etc.) of that person, and a case ID and dead line of a case under his charge. And, the other database 116 (a service management database) registers, for each service provided from the equipment designer's side, identification information of a person in charge, who provides the service in question.

In this case, the external storage 9 of the database server 12 further stores a building drawing management database, an installation drawing management database, an artistic design drawing management database, and a customer's specification management database, in addition to the above-mentioned drawing database.

The building drawing management database registers, for each case, a case ID, and building drawing data. Further, the installation drawing management database registers, for each case, a case ID, and installation drawing data. Further, the artistic design drawing management database stores, for each elevator, elevator artistic design drawing data, elevator perspective drawing data, and various kinds of data (elevator door opening direction, elevator's passenger capacity, a ceiling design pattern, material data, etc.) used for generating the elevator artistic drawing data and the elevator perspective drawing data. Further, the customer's specification management database registers studied information relating to an entrusted case, a case ID assigned to the entrusted case, and additional information (database registration data, mail address of a building designer, etc.) relating to the entrusted case.

Further, in this case, the WWW server 11 further comprises three input-output interfaces (4), (5) and (6) implemented by software such as a CGI program, in addition to the above-mentioned interfaces 3 and 8 and the CAD symbol automatic generation processing unit 7. Namely, the WWW server 11 further comprises: (4) a machine type/number planning interface 103, through which building information (purpose of a building, the number of floors, resident population of each floor, etc.) relating to the building, to which the elevator is to be installed, can be received from the building designer user terminal 2, and an elevator machine type/number plan can be gotten from the side of the building designer user terminal; (5) a design image generation interface 107, through which an elevator interior decoration study request can be received from the building designer user terminal 2, and elevator interior decoration image data can be gotten from the side of the WWW client terminals; and (6) an artistic design drawing generation request interface 108, through which an elevator artistic design drawing generation request can be received from the building designer user terminal 2, and elevator artistic design drawing data and elevator perspective drawing data can be taken out from the side of the WWW client terminals.

Figure 21:
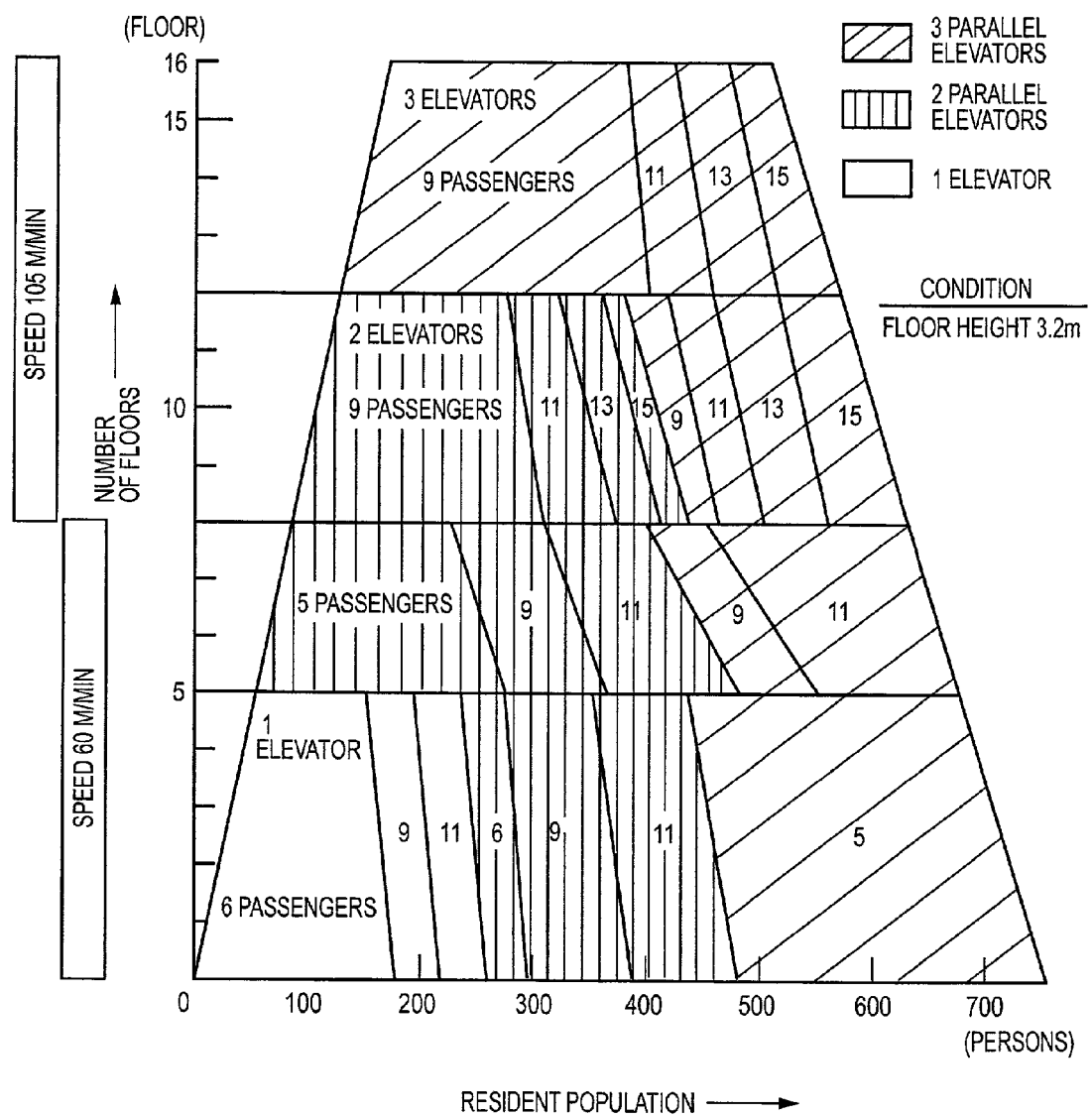
FIG. 21 is a conception diagram of an elevator machine type/number planning map related to an embodiment of the present invention.

Further, an external storage 126 of this WWW server 11 stores a building features database. The building features database registers, for each purpose (office building, apartment house, or the like) of a building, an elevator machine type/number planning map prepared for a building of that purpose. In each elevator machine type/number planning map, recommended elevator machine type/number planning information (recommended passenger capacity of an elevator, recommended transport speed of an elevator, and recommended number of elevators to be installed) can be obtained using a combination of the number of floors and resident population of the building as a retrieval key. For example, FIG. 21 shows conceptually data structure of an elevator machine type/number planning map for an office building. When this elevator machine type/number planning map is used in the case where the number of floors is "10" and resident population is "300", then, as recommended elevator machine type/number planning information, the elevator transport speed "105 m/min", the elevator passenger capacity "9", and the number of elevators to be installed "2" are obtained.

Next, a series of remote processing performed in the network system shown in FIG. 16 will be described step by step. Here, similarly to the above-described cases, an elevator is taken as an example of an order-made product.

Figure 17:
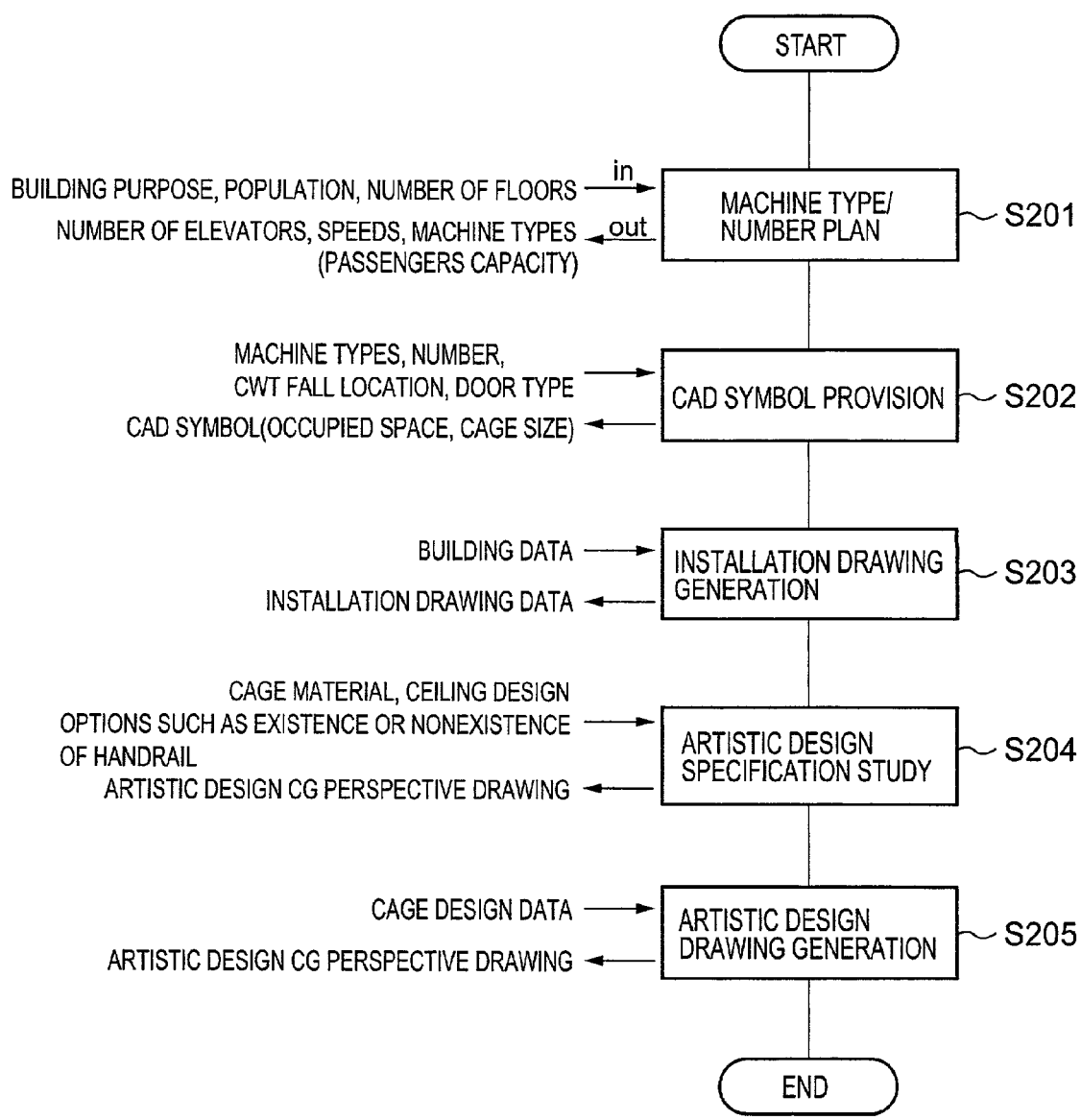
FIG. 17 is a flowchart showing a flow of remote processing according to an embodiment of the present invention.

As shown in FIG. 17, remote processing of the present embodiment is divided into the following five stages (a first stage S201, a second stage S202, a third stage S203, a fourth stage S204, and a fifth stage S205) seen from the side of a building designer who receives the service.

(1) First Stage (S201)

Figure 19:
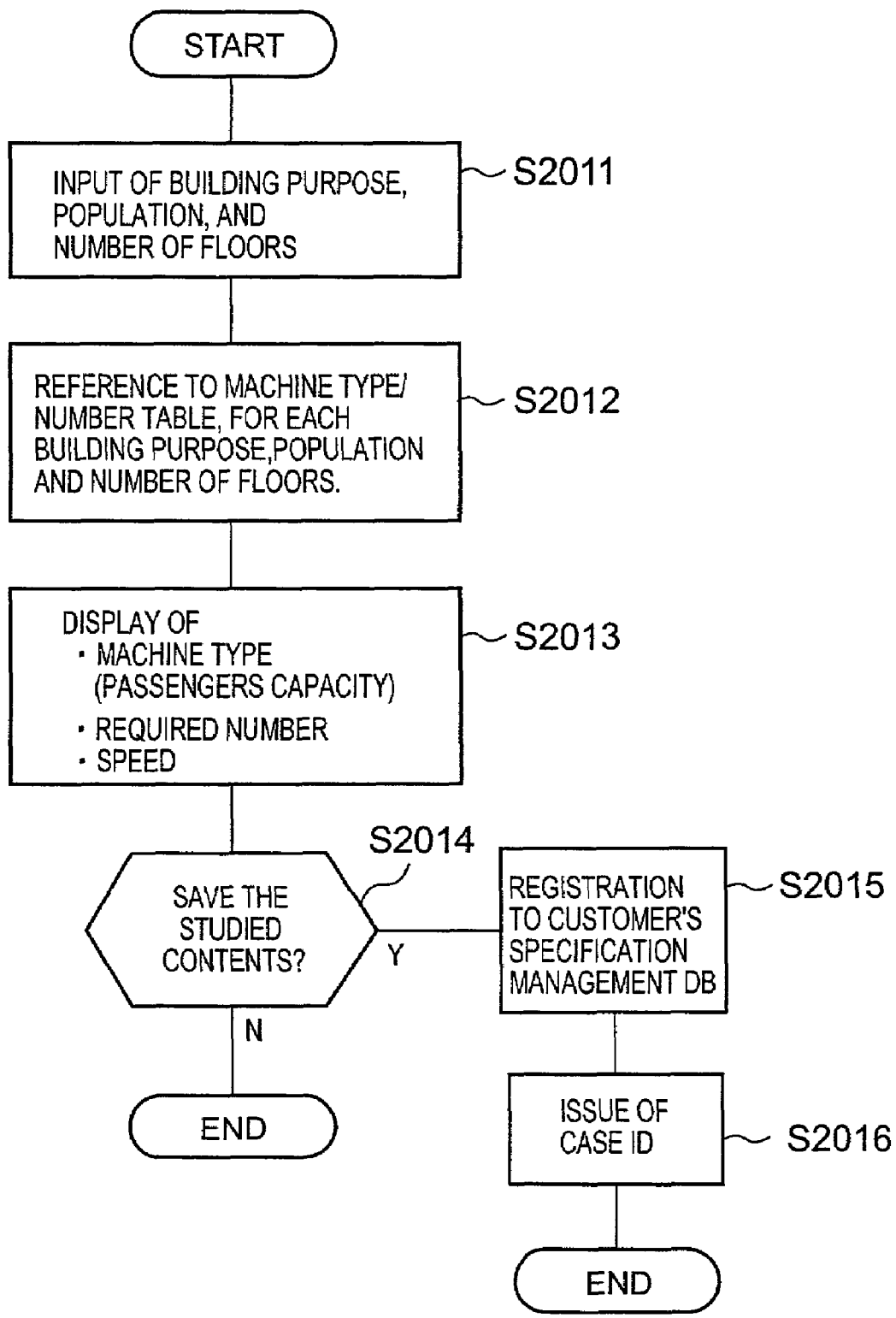
FIG. 19 is a flowchart showing a flow of processing in S201 of FIG. 17.

A flowchart of FIG. 19 shows a flow of detailed processing in this first stage (S201).

A building should be installed with elevators appropriate for traffic demand in the building. For example, the optimum transportation capacity of elevators to be installed differs depending on a purpose (office building, apartment house, or the like) of the building. Even if buildings have the same purpose, optimum transportation speeds of elevators to be installed in them differ depending on their heights. Thus, a building designer who designs a building provided with elevators should previously know specifications and number of elevators appropriate for the purpose and resident population of the building.

Figure 18:
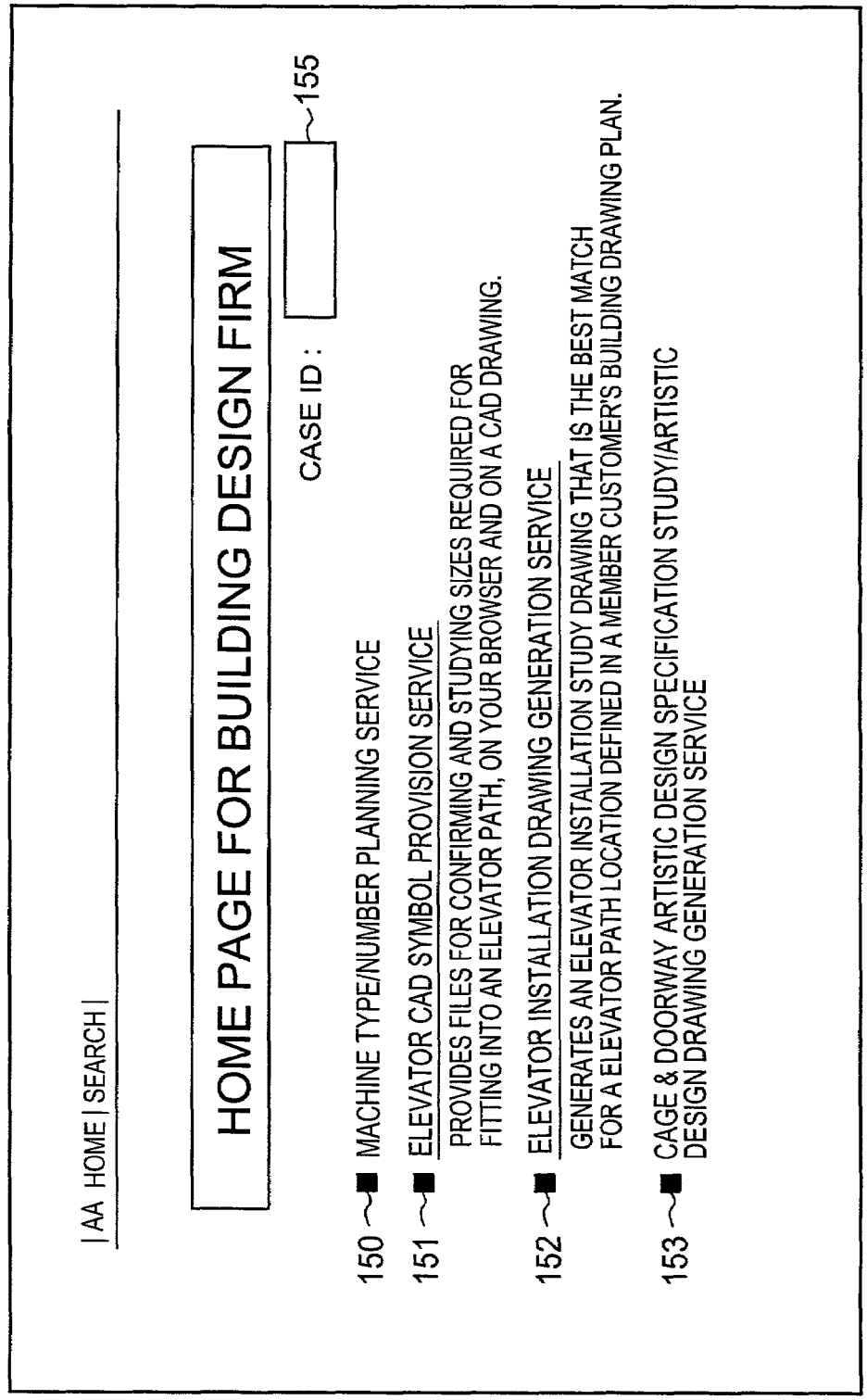
FIG. 18 is a view showing an example of a WWW page opened on a display screen of a user terminal for a building designer.

In such a case, the building designer first starts up a browser on his building designer user terminal 2, and establishes connection between his building designer user terminal 2 and the WWW server 11, to open a WWW page that provides elevator design service on his building designer user terminal 2. As shown in FIG. 18, a case ID input box 155, which is used for inputting a case ID of a study request, and a list of services provided 150–154 are arranged on the top page of this WWW page that provides the elevator design service.

Figure 20:
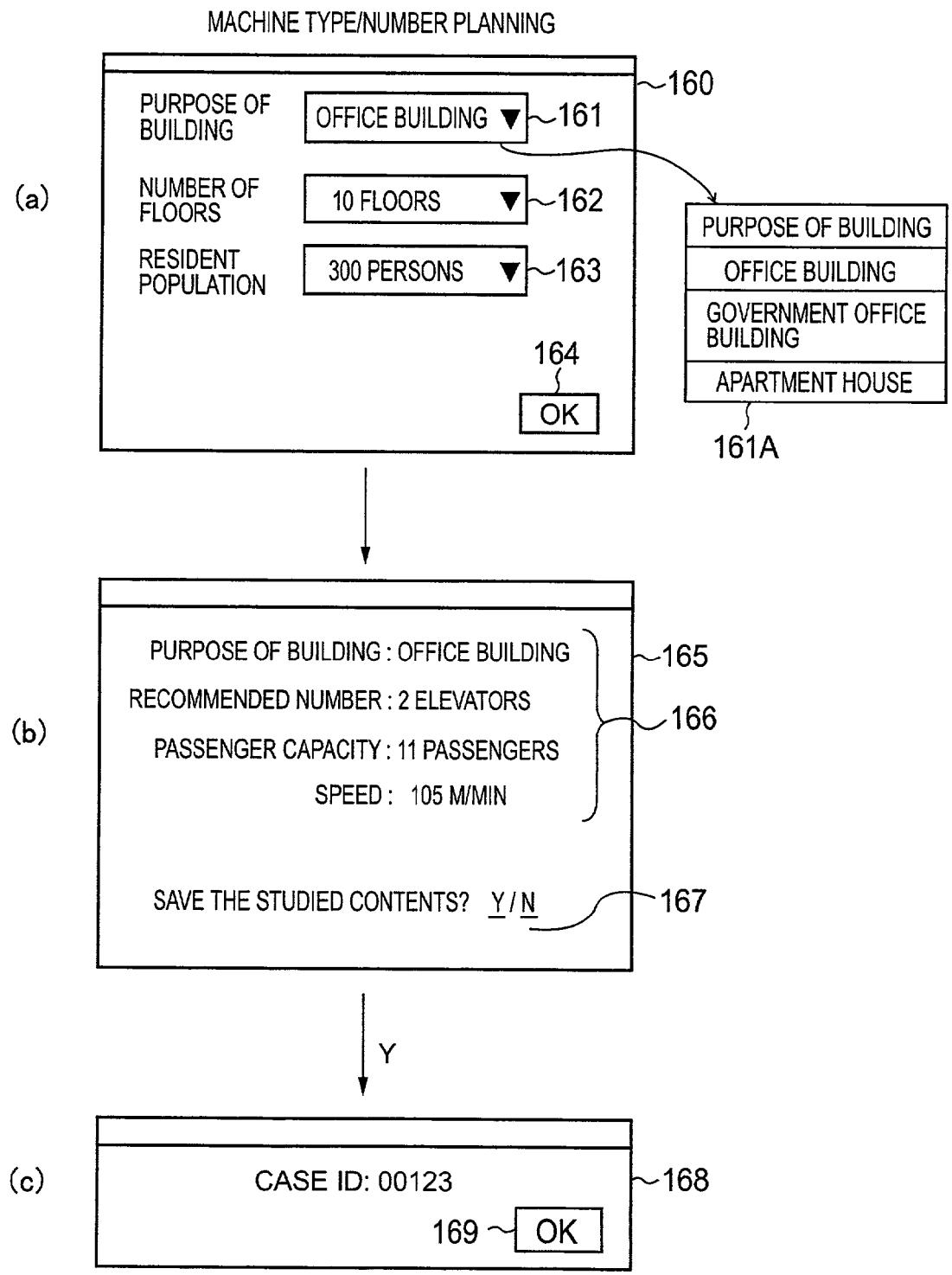
FIG. 20 is a view showing examples of WWW pages opened on a display screen of a user terminal for a building designer.

On this page, when the building designer selects "machine type/number planning service" 150 from the list of the services provided, while inputting nothing into the case ID input box 155, then, a building information input page 160 as shown in FIG. 20(a) is opened on the display screen of the building designer user terminal 2.

On this building information input page 160, is arranged a tool kit for inputting building information (purpose of a building to which elevators are to be installed, the number of floors of the building, and resident population of the building) relating to the building to which elevators are to be installed. In detail, on this page, are arranged: a building purpose input box 161 for inputting a purpose of the building to be installed with elevators; a building floor number input box 162 for inputting the number of floors of the building to be installed with elevators; a resident population input box 163 for inputting resident population of the building to be installed with elevators; and an OK button 164 for confirmation of setting the data in all the input boxes. Thus, after inputting appropriate data into these input boxes 161, 162 and 163, the building designer should click the OK button 164. Here, the input boxes 161, 162 and 163 are attached with respective buttons, and, a click of each button opens a pull-down menu showing a list of input data candidates to be inputted into an input box concerned. Thus, the building designer can simply select a suitable input data candidate as input data into each input box, from the list in the pull-down menu. For example, when the button attached to the building purpose input box 161 is clicked, then, a pull-down menu 161A showing a list of standard purposes (office building, government office building, apartment house, etc.) of a building installed with elevators is opened. Thus, the building designer can determine input data into the building purpose input box 161 by selecting one suitable building purpose from the list of these building purposes.

When the building designer finishes inputting data into the input boxes 161, 162 and 163, and thereafter, clicks the OK button 164, then, an elevator machine type/number planning retrieval request, which includes setting data (building information) set in the input boxes 161, 162 and 163, is sent to the WWW server 11 (S2011).

Receiving this elevator machine type/number planning retrieval request, the WWW server 11 takes out the building information (purpose of the building, the number of floors, and resident population) out of the request received, and performs database retrieval using the building information as retrieval keys. In detail, the WWW server 11 searches the building features database, and, out of the elevator machine type/number planning map (see FIG. 21) associated with one retrieval key (purpose of the building), recommended elevator machine type/number planning information associated with the remaining two retrieval keys (the number of floors and resident population) is obtained (S2012).

Then, the WWW server 11 returns the retrieval result (recommended passenger capacity of an elevator, recommended transport speed of an elevator, and the recommended number of elevators to be installed) to the building designer user terminal 2. By this, an elevator machine type/number plan display page 165 as shown in FIG. 20(b) is opened on the display screen of the building designer user terminal 2. And, the building purpose designated by the building designer and the retrieval results (recommended passenger capacity of an elevator, recommended transport speed of an elevator, and the recommended number of elevators to be installed) by the WWW server 11 are displayed as an elevator machine type/number plan 166. In addition, a message is displayed for asking if the elevator machine type/number plan displayed should be saved, while displaying two underlined letters "Y" and "N" for receiving a reply to the message (S2013). Here, when the building designer clicks the underlined letter "N" on one side, then, the top page shown in FIG. 18 is opened again on the display screen of the building designer user terminal 2 (S20215). When, however, the other underlined letter "Y" is clicked, a data save request, which includes the elevator machine type/number plan on display, is sent to the database server through the WWW server 11 (S2014).

Receiving this data save request, the database server 12 registers anew the elevator machine type/number plan (studied information on the entrusted case) included in the request into the customer's specification management database, associating it with the youngest case ID among unregistered case IDs and the present date (S2015). When the new data registration into the customer's specification management database is finished, the new case ID registered at this time is returned to the building designer user terminal 2 through the WWW server 11 (S2016). By this, a case ID confirmation page 168 as shown in FIG. 20(c) is opened on the display screen of the building designer user terminal 2. This case ID confirmation page displays the new case ID assigned to the entrusted case, and an OK button 169 is arranged on this page. When the building designer confirms the new case ID and thereafter clicks the OK button 169, then, the top page (see FIG. 18) is displayed again on the building designer user terminal 2. And, at the same time, the service name "machine type/number planning service" of the service provided this time and the new case ID are saved, being associated with each other.

In building design of a building installed with elevators, a building designer does not always study fitting of the elevators immediately after determination of an elevator machine type/number plan. In many times, before studying the fitting, the design of the building is usually further proceeded. According to this extended system, when the elevator machine type/number plan 166 displayed on the WWW page has no particular problem, the plan 166 can be saved into the database on the network for the time being. Thus, the building designer can disconnect his building designer user terminal 2 from the WWW server 11, and return to his building design work.

(2) Second Stage (S202

Figure 22:
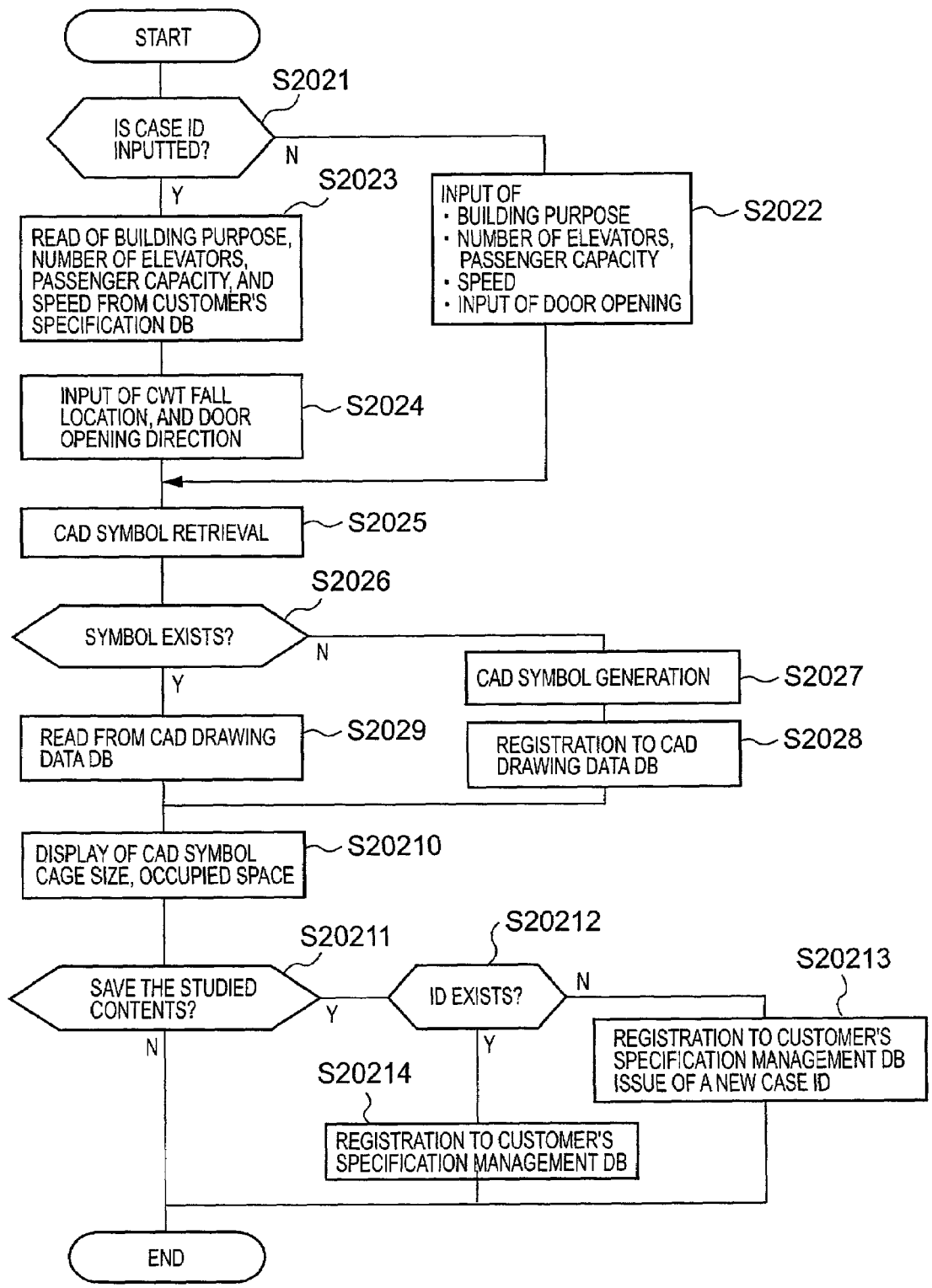
FIG. 22 is a flowchart showing a flow of processing in S202 of FIG. 17.

A flowchart of FIG. 22 shows a flow of detailed processing in this second stage (S202).

In the subsequent process of the building design, reaching at a stage where the fitting of the elevator is to be studied, the building designer establishes the connection between his building designer user terminal 2 and the WWW server 11 again, to open the WWW page that provides the elevator design service on his building designer user terminal 2 (see FIG. 18).

When the building designer, who proceeds with the study based on a plan different from the elevator machine type/number plan presented last time, selects the service provided, "elevator CAD symbol providing service" 151, while inputting nothing into the case ID input box 155, then, the elevator design page shown in FIG. 5 is opened on the display screen of the building designer user terminal 2.

As described above, the building designer should at least input data (purpose of an elevator, specification number of the elevator, or door opening direction) into each of the input boxes 50, 51 and 52, for each of the number of elevators to be installed on this page (S2022). Selection of options, such as existence of a trunk, a counter weight position, and the like, may be made appropriately if necessary.

On the other hand, when the building designer, who proceeds with the study based on the elevator machine type/number plan presented last time, inputs the case ID issued last time into the case ID input box 155 and thereafter pushes a return key, then, the text on the WWW page is changed in its style. In detail, in the list of the names of the services provided on the WWW page shown in FIG. 18, the service name displayed next to the service name "machine type/number planning service" that corresponds to the inputted case ID and is presently saved, namely, the service name "elevator CAD symbol providing service" 151 of the service that the building designer is to receive next is highlighted. By this, the building designer can grasp at a glance the service to receive first in this access, even if a long time has elapsed from the last access.

Thereafter, when the building designer selects the service provided "elevator CAD symbol providing service" 151, then, a studied information retrieval request, which includes the case ID inputted into the case ID input box 155, is sent to the database server 12 through the WWW server 11. The database server 12 makes a database search, using, as a retrieval key, the case ID included in this retrieval request, to take out studied information (purpose of the building, recommended number of elevators to be installed, recommended passenger capacities of the elevators, and recommended transport speeds of the elevators) from the customer's specification management database, and returns this information (S2023).

Figure 23:
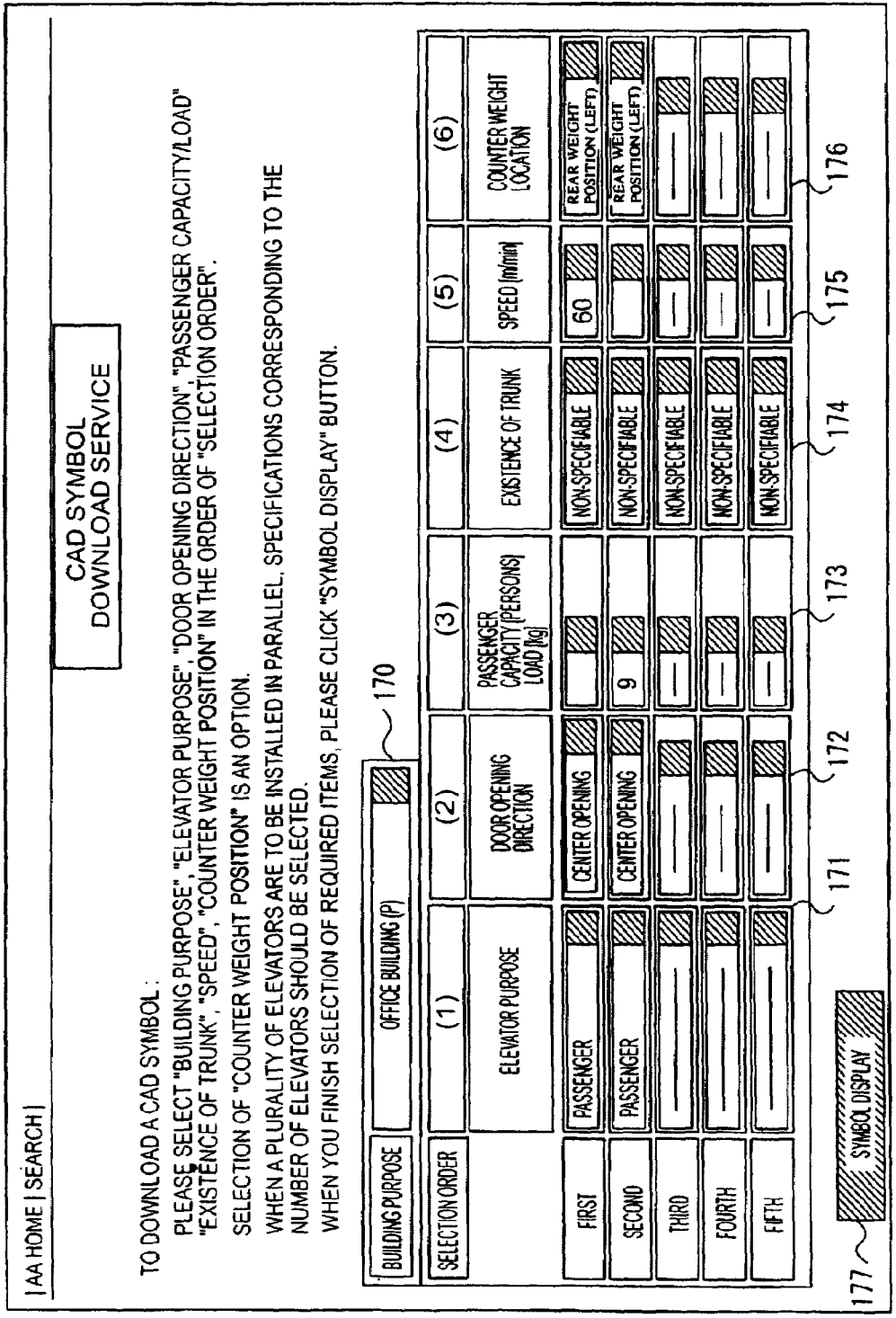
FIG. 23 is a view showing an example of a WWW page opened on a display screen of a user terminal for a building designer.

An elevator basic specification input page shown in FIG. 23 is displayed on the building designer user terminal 2 that has received this return data (the purpose of the building, the recommended number of the elevators to be installed, the recommended passenger capacities of the elevators, and the recommended transport speeds of the elevators). In this case, however, default data (the purpose of the building, the recommended number of elevators to be installed, and recommended transport speeds of the elevators, included in the return data) have been already set in a building purpose input box 170, and cage capacity input boxes 173 and transport speed input boxes 175 corresponding to the recommended number of elevators included in the return data. Thus, it is sufficient that the building designer only sets appropriate data into elevator purpose input boxes 171 and door opening direction input boxes 172 corresponding to the recommended number of elevators, and, if necessary, changes the default data of the cage capacity input boxes 173 and the transport speed input boxes 175 (S2024). Further, with respect to selection of options, such as existence of a trunk, a counter weight position, and the like, appropriate data may be set into each of the input boxes 174 and 176 if necessary.

Now, when the building designer sets the required data and thereafter clicks the symbol display button 53 or 177 on the page of FIG. 5 or 23, then, the database server 12 performs database retrieval for a CAD symbol, similarly to the above-described case (S2025).

Figure 24:
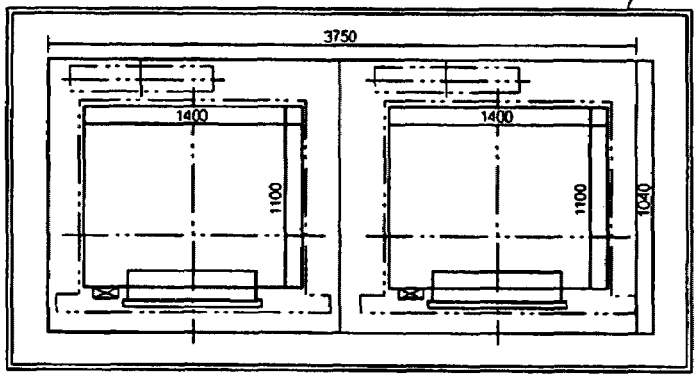
FIG. 24 is a view showing an example of a WWW page opened on a display screen of a user terminal for a building designer.

At that time, when the database server 12 succeeds in the database retrieval for a CAD symbol (S2026), then, the retrieval result is returned to the building designer user terminal 2, similarly to the above-described case (S2029). By this, similarly to the above-described case, a CAD symbol 180 conforming to the requirements specification of the building designer is displayed on the building designer user terminal 2 as shown in FIG. 24 (S20210). In this case, however, a message 181 is displayed for asking if the CAD symbol on display and its related information should be saved, while displaying two underlined letters "Y" and "N" for receiving a reply to the message.

Here, when the building designer clicks the underlined letter "N" on one side (S20211), then, the top page (see FIG. 18) is opened again on the display screen of the building designer user terminal 2. When, however, the other underlined letter "Y" is clicked (S20211), then, a data save request, which includes the CAD symbol on display and its related information (building information, the number of elevators to be installed, transport speed, passenger capacity, door opening direction, etc.), is sent to the database server 12 through the WWW server 11. Here, when a case ID has been already assigned to the case in which supply of the CAD symbol is requested this time, then, the case ID is also sent together with the data save request to the database server 12 at this time.

Receiving this data save request, the database server 12 takes out the case ID from the data save request (S20212).

Here, when a case ID can not be taken out from the data save request, then, the CAD symbol etc. (studied information relating to the entrusted case) included in the data save request are registered anew into the customer's specification management database, associating them with the youngest case ID among unregistered case ID and the present date. Thereafter, the new case ID registered this time is returned to the building designer user terminal 2 through the WWW server 11 (S20213).

By this, a case ID confirmation page 168 as shown in FIG. 20(c) is opened on the display screen of the building designer user terminal 2. This case ID confirmation page displays the new case ID assigned to the case entrusted by the building designer, and an OK button 169 is arranged on the page. When the building designer confirms the new case ID and thereafter clicks the OK button 169, then, the top page shown in FIG. 18 is displayed again on the building designer user terminal 2. And, at the same time, the service name "elevator CAD symbol providing service" of the service provided this time and the new case ID are saved, being associated with each other.

On the other hand, when the case ID can be taken out from the data save request, then, the database registration date and studied information registered in the customer's specification management database being associated with that case ID are updated with the present date and CAD symbol etc. included in the data save request. Thereafter, a message that database registration of the CAD symbol has been successful is returned to the building designer user terminal 2 through the WWW server 11 (S20214). On the side of the building designer user terminal 2 that receives this message, the top page of FIG. 18 is displayed again on the building designer user terminal 2. And, at the same time, the service name "elevator CAD symbol providing service" of the service provided this time and the new case ID are saved, being associated with each other.

When the database server 12 fails in the database retrieval of a CAD symbol (S2026), then, similarly to the above-described case, the WWW server 11 disconnects it from the building designer user terminal 2, and thereafter, generates a CAD symbol conformed to the requirements specification of the building designer (S2027). Then, similarly to the above-described case, the WWW server 11 requests the database server 12 to register the newly-generated CAD symbol, and request the mail server on the network to distribute an e-mail addressed to the building designer to inform him of the completion of the CAD symbol and its storage location (S2028).

When the building designer knows the completion and storage location of the CAD symbol by means of an arrival of the e-mail from the WWW server 11 and downloads the CAD symbol from the storage location, then, similarly to the above-described case, the CAD symbol 180 conformed to the requirements specification of the building designer is displayed on the building designer user terminal 2, as shown in FIG. 24 (S20210). In this case, however, a message 181 is displayed for asking if the CAD symbol on display should be saved, while displaying two underlined letters "Y" and "N" for receiving a reply to the message. Here, no matter which of the two underlined letters "Y" and "N" the designer clicks (S20211), processing is performed similarly to the case where database retrieval of a CAD symbol has succeeded.

In some cases, the same building designer undertakes designing of a plurality of buildings (for example, buildings of chain stores) proving a sensation of unity in their insides, at different times respectively. It is supposed that those plurality of buildings are installed with elevators having common basic specifications (transport speed, and passenger capacity) etc. Accordingly, in this extended system, a CAD symbol and its related information provided on the WWW page are registered into the customer's specification management database on the network when the designer wishes, so that the CAD symbol and basic specification data can be downloaded any number of times after that, if the designer needs them.

(3) Third Stage (S203)

Figure 25:
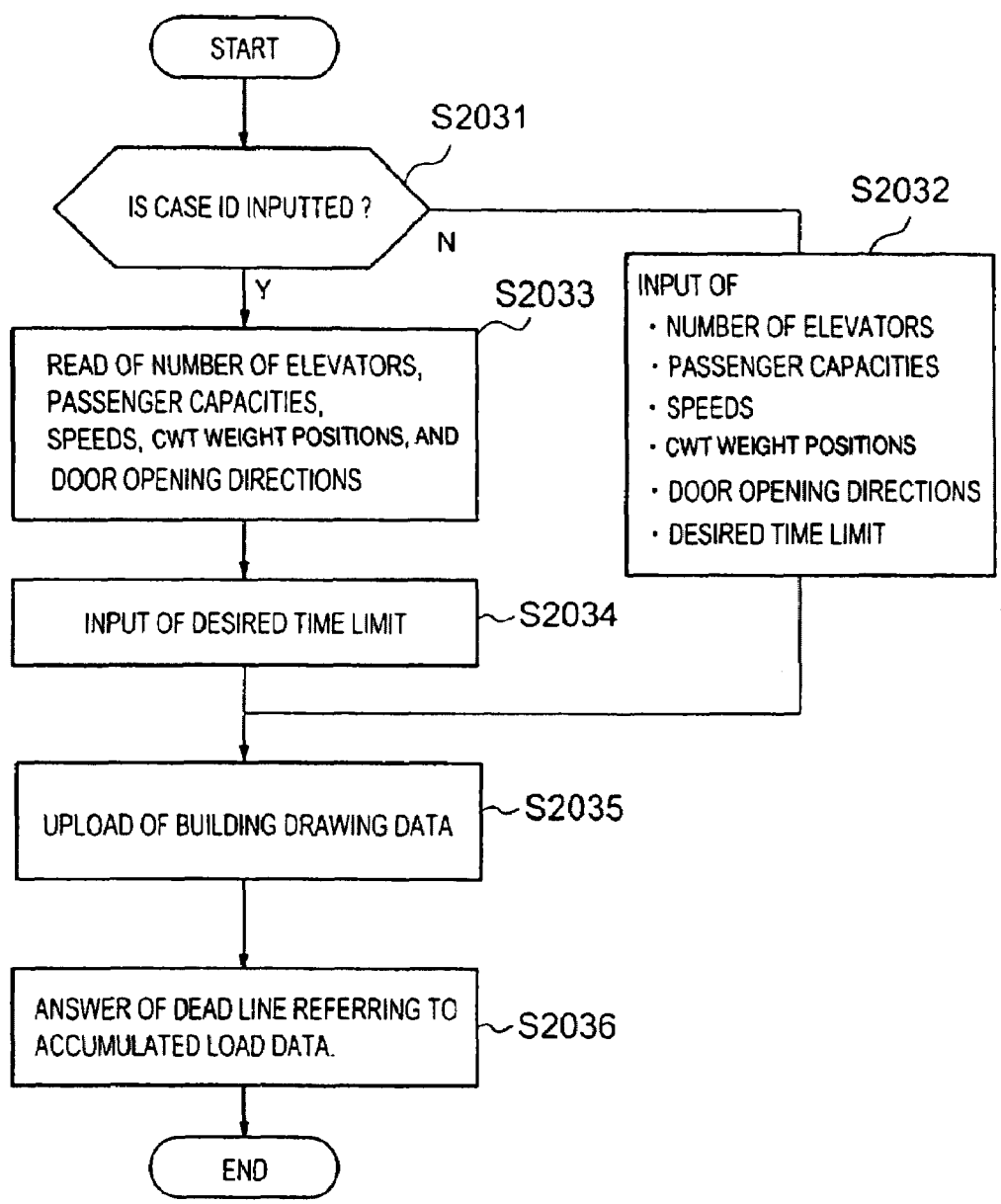
FIG. 25 is a flowchart showing a flow of processing in S203 of FIG. 17.

A flowchart of FIG. 25 shows a flow of detailed processing in the first half of this third stage (S203).

In the subsequent process of the building design, reaching at a stage where plotting of an installation drawing is to be requested to the equipment designer (elevator designer), the building designer establishes the connection between his building designer user terminal 2 and the WWW server 11 again, to open the WWW page (as shown in FIG. 18) that provides the elevator design service.

When, in the case of the building designer who has generated building drawing data by using a CAD symbol that was not saved at the time of last access, the building designer selects "elevator installation drawing generation service" 152 on the top page of FIG. 18 from the list of services provided while inputting nothing into the case ID input box 155, then, an installation drawing generation page shown in FIG. 26(a) is opened. On this page, are arranged tools for inputting data required for an elevator installation drawing generation request. In detail, on this page, are arranged: a case ID input box 190 for inputting a case ID with which generation of installation drawing data is requested; an elevator installation number input box 191 for inputting the number of elevators to be installed; a building purpose input box 192 for inputting a purpose of a building to be installed with the elevators; a building floor number input box 193 for inputting the number of floors of the building to be installed with the elevators; input boxes 194 for inputting respectively basic specifications etc. for the elevators; a building drawing data input box 195 for inputting a file name of building drawing data; a drawing requisition date input box 196 for inputting a desired dead line (date) for receiving an installation drawing; and a sending button 197 for instruction of sending the data set in the input box. Here, the case ID input box 190 is displayed as an inactive box.

In this case, when the building designer inputs suitable data into the boxes 191–196 other than the case ID input box 190 and thereafter clicks the sending button 164 (S2031), then, an installation drawing generation request, which includes the data set into the input boxes 191–196 other than the case ID input box 190, is sent to the equipment designer user terminal 1 through the WWW server 12 (S2032).

On the other hand, in the case of the building designer who has generated building drawing data by using the CAD symbol saved at the time of last access, when the building designer inputs, the case ID issued last time into the case ID input box 155 as a case ID of the installation drawing generation request, and pushes the return key, then, the text on the top page is changed in its style. In detail, in the list of the names of the services provided, on the top page of FIG. 18, the service name displayed next to the service name "elevator CAD symbol providing service" that corresponds to the installation drawing generation request case ID and is presently saved, namely, the service name "elevator installation drawing generation service" 152 of the service that the building designer is to receive next is highlighted. By this, the building designer can grasp at a glance the service to receive first in this access, even if a long time has elapsed from the last access.

Thereafter, when the building designer selects the service provided "elevator installation drawing generation service" 152, then, a studied information retrieval request, which includes the installation drawing generation request case ID, is sent to the database server 12 through the WWW server 11. The database server 12 makes a database search using, as a retrieval key, the case ID included in this retrieval request, to take out studied information from the customer's specification management database, and returns this information.

An installation drawing generation request page shown in FIG. 26(a) is displayed on the building designer user terminal 2 that has received this return data (S2033). In this case, however, default data (the case ID, the number of elevators, the purpose of the building, the number of floors, the passenger capacities of the elevators, the transport speeds of the elevators, door opening directions, option data, etc.) have been already set in the input boxes 190–194 other than the building drawing data input box 195 and the drawing requisition date input box 196. Thus, it is sufficient that the building designer only sets suitable data into the building drawing data input box 195 and the drawing requisition date input box 196 (S2034). When the building designer inputs these data and thereafter clicks the sending button 164, then, a data save request, which includes the setting data in the input boxes 190–196, is sent to the database server 12 through the WWW server 12.

Now, receiving the data save request from the building designer user terminal 2, the database server uploads the building drawing data corresponding to the file name included in this data save request (S2035). Then, the case ID included in this data save request and the building drawing data are registered into the building drawing management database, being associated with each other, and the case ID registered at this time is sent to the building designer user terminal 2.

The building designer user terminal 2 sends the installation drawing generation request, which includes this returned case ID, to the management terminal 112 through the WW server 11. The management terminal 112 first takes out identification information of equipment designers who provide the installation drawing generation service, from the service management database 116. Further, case IDs and their dead lines corresponding to each piece of identification information obtained this time are taken out from the load management database 115.

Based on the results, the equipment designer having the least number of cases under his charge is determined as a person to whom plotting of the present installation drawing is requested. The dead line of the installation drawing to be requested this time is determined by adding a predetermined working period to the dead line of the last case under the charge of this equipment designer. Then, the management terminal 112 sends the result determined this time to the WWW server 11, and updates the load management database 115 with the result determined this time.

Receiving the sent data, the WWW server 11 requests the mail server on the network to distribute an e-mail addressed to the person in charge to inform him of the file name and storage location of the building data, the case ID, and the dead line, and, at the same time, sends the case ID and the dead line to the building designer user terminal 2 (S2036).

By this, a dead line answer page shown in FIG. 26(b) is opened on the display screen of the building designer user terminal 2. On this dead line answer page, are displayed the case ID 198 and the dead line 199 included in the return data. Further, an OK button 200 is arranged on this dead line answer page. When the building designer confirms the contents on display and thereafter clicks the OK button 169, then, the top page of FIG. 18 is opened again on the display screen of the building designer user terminal 2, and the service name "elevator installation drawing generation service" of the service provided this time and the case ID of the case of the installation drawing generation request are saved being associated with each other.

Figure 27:
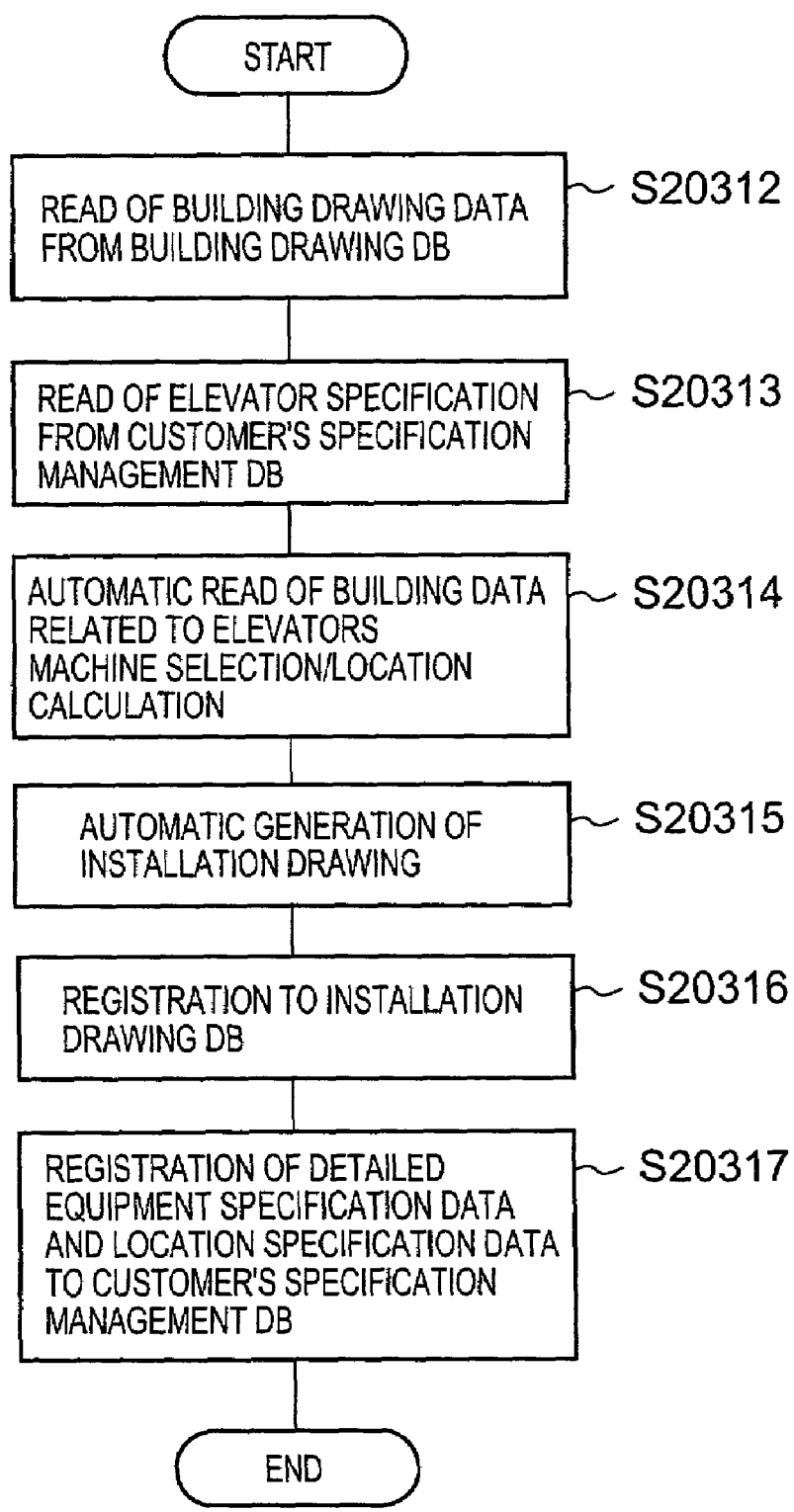
FIG. 27 is a flowchart showing a flow of processing in S203 of FIG. 17.
Figure 28:
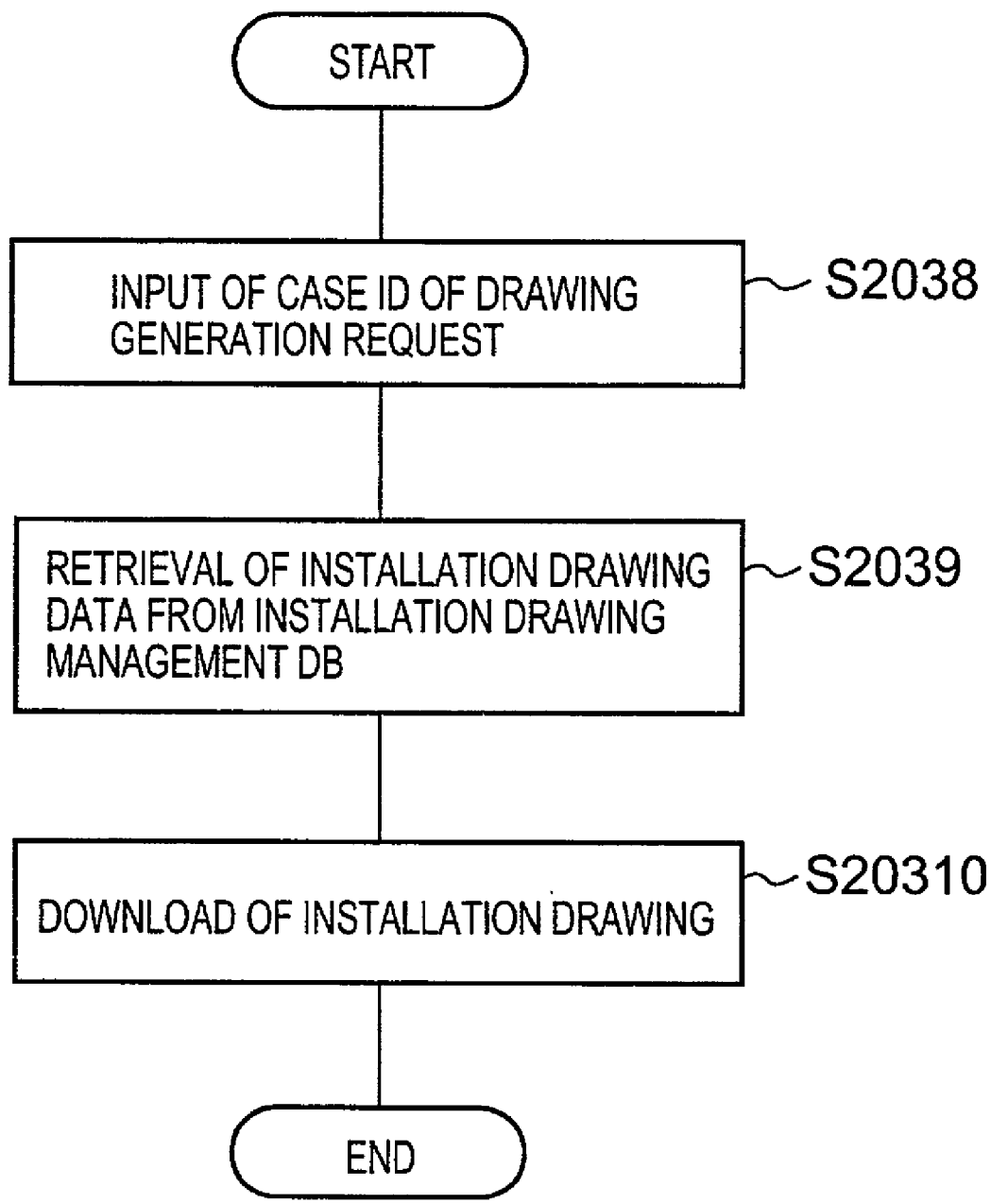
FIG. 28 is a flowchart showing a flow of processing in S203 of FIG. 17.

Flowcharts of FIGS. 27 and 28 show a flow of detailed processing in the latter half of this third stage.

In the equipment designer user terminal 1 of the equipment designer determined as the person in charge of the installation drawing requested this time, processing shown in FIG. 27 is performed when the time determined in his schedule arrives. First, the building drawing data is taken out from the building drawing management database (S20312), and further, the studied information is taken out from the customer's specification management database (S20313). Then, based on these data, the above-described elevator shaft relevance building data automatic read processing and equipment selection/location calculation processing (S20314) are performed. Further, the installation drawing generation processing (S20315) is performed, and the installation data generated as a result of the processing is registered together with the installation drawing generation request case ID into the installation drawing management database (S20316). Then, detailed data that have been determined in the above-mentioned processes are registered as studied information additionally into the customer's specification management database, and the mail server on the network is requested to distribute an e-mail addressed to the client to inform him of the storage location of the installation drawing data and the case ID of the installation drawing generation request (S20317).

When the building designer knows the completion of the installation drawing data by means of an arrival of the e-mail, then, in order to download the installation drawing data, he starts up again the browser on his building designer user terminal 2 to establish connection between his building designer user terminal 2 and the WWW server 12, and to open an installation drawing download page as shown in FIG. 29(a) on the display screen of his building designer user terminal 2. On this installation drawing download page, are arranged a case input box 210 for inputting the case ID of the installation drawing generation request for the installation drawing that he wishes to download, and a sending button 211 for instruction of sending the case ID of the installation drawing generation request. When the building designer inputs the installation drawing generation request case ID that he knows from the e-mail into the case input box 210, and further, clicks the sending button 211 (S2038), then, a page as shown in FIG. 29(b) is opened. On this page, is arranged an underlined character string 212 for instructing download of the installation drawing data. When the building designer clicks this character string 212, then, an installation drawing retrieval request including the installation drawing generation request case ID is sent to the database server 12 through the WWW server 11. Correspondingly, the database server 12 takes out the installation drawing data associated with the installation drawing generation request case ID from the installation drawing management database (S2039). Then, the installation drawing data are downloaded to the building designer user terminal 2 (S20310).

Working hours on the building designer's side and those on the equipment designer's side do not always coincide with each other. Further, even when the equipment designer receives a new installation drawing generation request from the building designer, the equipment designer can not always deal with a new installation drawing generation request immediately, depending on a relation to formerly-received installation drawing generation requests, or the like. Similarly, also the building designer's side does not proceed with his working according to completion of the installation drawing data on the side of the equipment designer. Namely, the building designer's side and the equipment designer's side make their respective schedules, and it is not possible for each side to always adjust his schedule to the partner. Thus, according to this extended system, the building designer user terminal and the equipment designer user terminal exchange drawing data through databases, and such arrangement absorbs a time lag that may occur between the progress of the design work on the side of the building designer and the progress of the installation drawing work on the side of the equipment designer.

Further, a present state of load of each equipment designer is managed, and a new installation drawing generation request is entrusted to the equipment designer who has the lightest load at present. Such arrangement gives advantages to the building designer's side by shortening his waiting time between a request and completion of an installation drawing, and to the equipment designer's side by improving overall working efficiency caused by leveling of his loads.

(4) Fourth Stage (S204)

Figure 30:
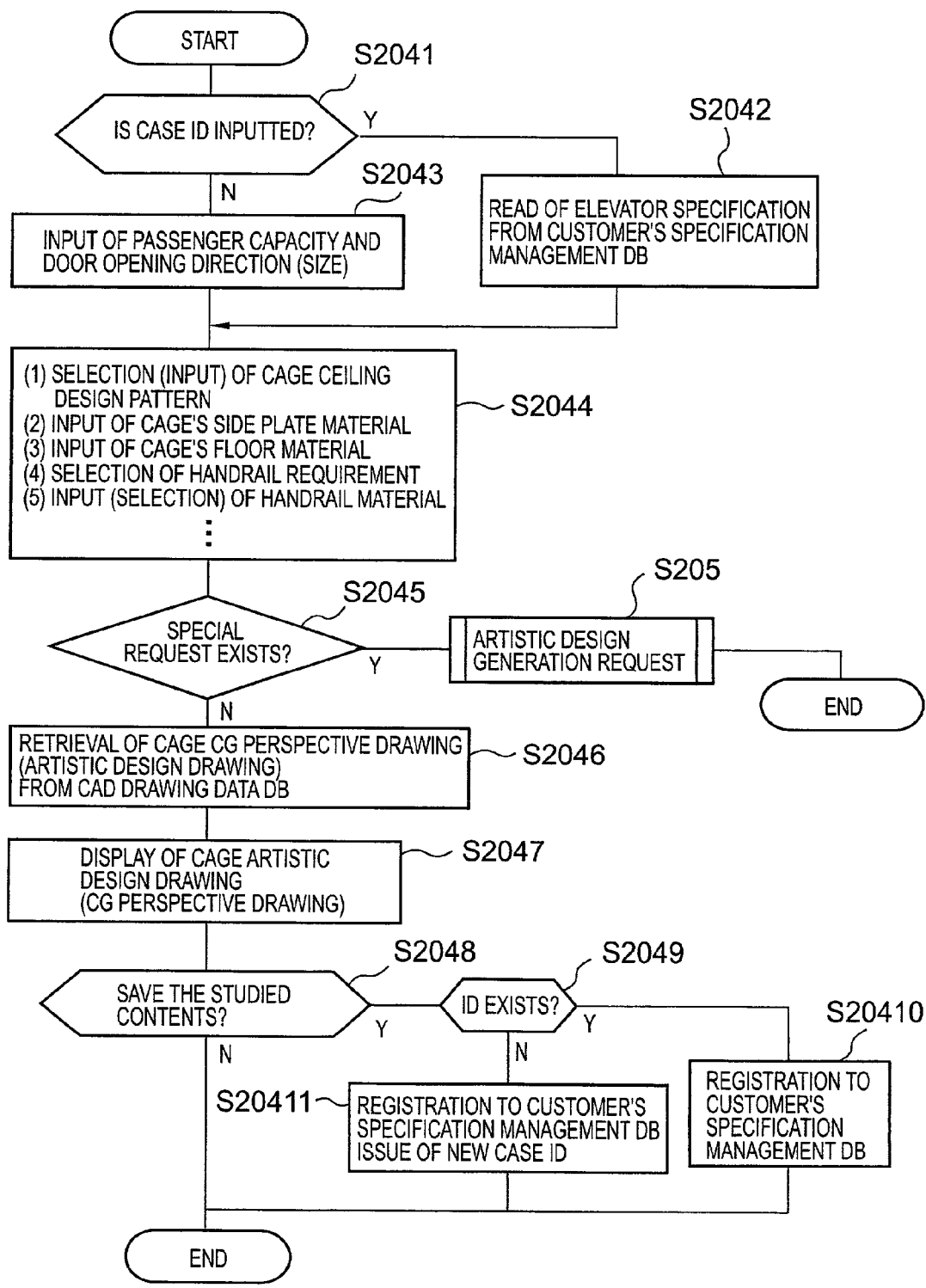
FIG. 30 is a flowchart showing a flow of processing in S204 of FIG. 17.

A flowchart of FIG. 30 shows a flow of detailed processing in this fourth stage (S204).

When the elevator installation drawing data is completed (by an equipment designer or by the building designer himself), then, the building designer must study specification of interior decoration. Reaching this stage, the building designer establishes again connection between his building designer user terminal 2 and the WWW server 11, to open the WWW page that provides the elevator design service (see FIG. 18), on the display screen of his building designer user terminal 2.

Figure 31:
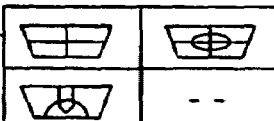
FIG. 31 is a view showing an example of a WWW page opened on a display screen of a user terminal for a building designer.

When the building designer, who has completed the elevator installation drawing data by himself, selects the desired service provided, "cage/doorway artistic design specification study service" 153 from the list of the services provided, while inputting nothing into the case ID input box 155, on the top page of FIG. 18, then, an artistic design specification study page shown in FIG. 31 is opened. On this page, are arranged tools for inputting data required for studying an artistic design specification of an elevator. In detail, on this page, are arranged: a case ID input box 220 for inputting a case ID with which study of artistic design is requested; a building purpose input box 221 for inputting a purpose of a building to be installed with elevators; a floor number input box 222 for inputting the number of floors of the building to be installed with the elevators; an input box 223 for inputting data (door opening direction and passenger capacity) required for determining a case size etc. of each elevator; a group of icons 224 for selecting a ceiling design pattern; a list box 225 for selecting a side plate material; a list box 226 for selecting a floor material; a check button 228 and a list box 227 for selecting existence or nonexistence of a handrail and its material; a sending button 229; and the like. In this case, however, the case ID input box 220 only is displayed as an inactive box.

In this case, the building designer must input suitable data into the input box 221–223 other than the case ID input box 220, and thereafter, select suitable materials from other list boxes 224–227 (S2044). Here, the material of the handrail should be selected only if the handrail is to be fitted.

On the other hand, in the case of the building designer who obtains the elevator installation drawing data generated by the equipment designer user terminal 1, when the building designer inputs the case ID into the case ID input box 155 and pushes the return key, then, the text on the WWW page is changed in its style. In detail, in the list of the names of the service provided, on the WWW page of FIG. 18, the service name displayed next to the service name "elevator installation drawing generation service" that corresponds to the inputted case ID and is presently saved, namely, the service name "cage/doorway artistic design specification study service" 153 of the service that the building designer is to receive next is highlighted. By this, the building designer can easily grasp the service to receive first in this access.

Thereafter, when the building designer selects the desired service provided "case/door way artistic design specification study service" 153 from the list of the services provided, then, a studied information retrieval request, which includes the case ID inputted into the case ID input box 155, is sent to the database server 12 through the WWW server 11. The database server 12 makes a database search using, as a retrieval key, the case ID included in this retrieval request, to take out studied information (purpose of the building, the recommended number of elevators to be installed, recommended passenger capacities of the elevators, and recommended transport speeds of the elevators) from the customer specification management database, and returns this information (S2042).

An artistic design specification study page shown in FIG. 31 is displayed on the building designer user terminal 2 that has received this return data (the purpose of the building, the recommended number of the elevators to be installed, the recommended passenger capacities of the elevators, and the recommended transport speeds of the elevators). In this case, however, default data (the purpose of the building, the number of the floors, the recommended passenger capacities of the elevators, the recommended transport speeds of the elevators, the door opening directions, and the option data) have been already set into the input boxes 220, 221, 222 and 223 on the page. Thus, it is sufficient that the building designer only selects suitable materials from the list boxes 224–227 (S2044). Here, the material of the handrail should be selected only if the handrail is to be fitted.

Now, when the building designer sets the required data and thereafter clicks the sending button 229, on the page of FIG. 32, then, the building designer user terminal 2 judges if a special ceiling design pattern or a special material is included in the data set on the page (S2045).

As a result, when at least a special ceiling design pattern or a special material is included, then, subsequent processing goes to the below-described fifth stage (S205).

On the other hand, when neither a special ceiling design pattern nor a special material is included, then, a database retrieval request, which includes the set data (the passenger capacity, the door opening direction, the material data, the ceiling pattern, etc.) for each elevator, is sent to the database server 12 through the WWW server 11. Receiving this database retrieval request, the database server 12 searches the artistic design drawing management database for elevator artistic design drawing data and elevator perspective drawing data associated with the data included in the database retrieval request (S2046). And, the retrieval result is returned to the client 2 of the database retrieval request through the WWW server 11. By this, elevator perspective drawing data 230 included in the return data are displayed graphically as shown in FIG. 32(a), on the page opened on the display screen of the building designer user terminal 2. In addition, a message 231 is displayed for asking the building designer if the data on display and its related information should be saved, while displaying two underlined letters "Y" and "N" for receiving a reply to the message (S2047).

Here, when the building designer clicks the underlined letter "N" on one side (S2048), the top page (see FIG. 18) is opened again on the display screen of the building designer user terminal 2. When, however, the other underlined letter "Y" is clicked (S2048), then, a data save request, which includes the data on display and its related information (elevator perspective drawing data, elevator artistic design drawing data, ceiling design pattern, material data, building information, the number of elevators to be installed, transport speeds, passenger capacities, door opening directions, etc.) is sent to the database server 12 through the WWW server 11. Here, when a case ID has been already assigned to the case in which study of the artistic design is requested this time, then, the case ID is also sent together with the data save request to the database server 12 at this time.

Receiving this data save request, the database server 12 takes out the case ID from the data save request (S2049).

Here, when a case ID can not be taken out from the data save request, then, the elevator artistic design drawing data etc. (studied information relating to the entrusted case) included in the data save request are registered anew into the customer's specification management database, associating them with the youngest case ID among unregistered case ID and the present date. Thereafter, the new case ID registered this time is returned to the building designer user terminal 2 through the WWW server 11 (S40411). By this, a case ID confirmation page 232 as shown in FIG. 32(b) is opened on the display screen of the building designer user terminal 2. This case ID confirmation page displays the new case ID assigned to the case entrusted by the building designer, and an OK button 233 is arranged on the page. When the building designer confirms the new case ID and thereafter clicks the OK button 233, then, the top page of FIG. 18 is displayed again on the display screen of the building designer user terminal 2. And, at the same time, the service name "cage/doorway artistic design study service" of the service provided this time and the new case ID are saved, being associated with each other.

On the other hand, when the case ID can be taken out from the data save request (S4049), then, the database server 12 updates the database registration date registered in the customer's specification management database being associated with that case ID, into the present date. And, the elevator artistic design drawing data etc. included in the data save request is registered additionally to the studied information registered in association with that case ID in the customer's specification management database (S20410). Thereafter, the database server 12 returns a message that database registration of the elevator artistic design drawing data etc. has been successful, to the client 2 who has entrusted the study of the artistic design, through the WWW server 11 (S20214). On the side of the building designer user terminal 2 that receives this message, the top page of FIG. 18 is opened again on the display screen of the building designer user terminal 2. And, at the same time, the service name "cage/doorway artistic design study service" of the service provided this time and the case ID are saved, being associated with each other.

(5) Fifth Stage (S205)

Figure 33:
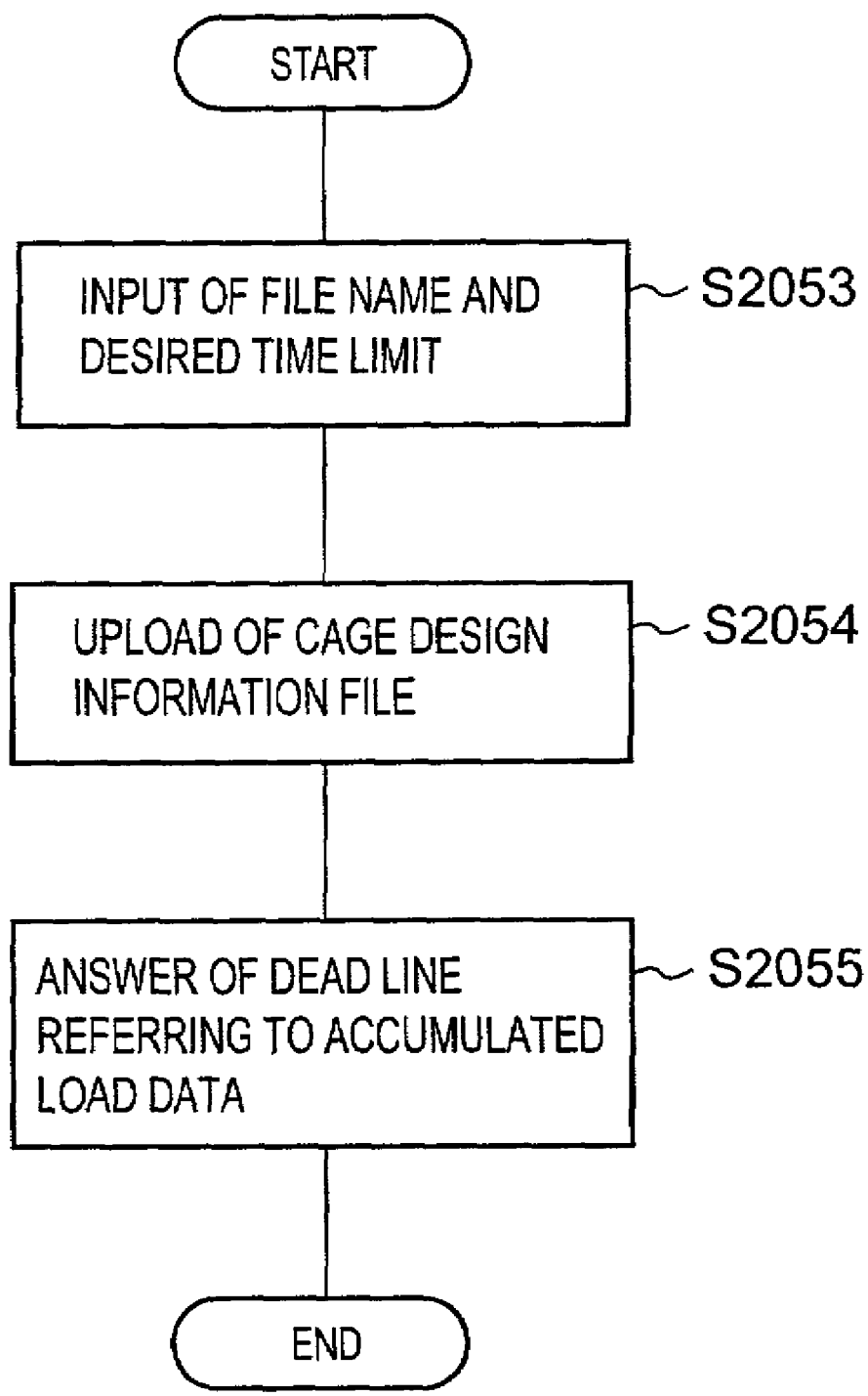
FIG. 33 is a flowchart showing a flow of processing in S205 of FIG. 17.

A flowchart of FIG. 33 shows a flow of detailed processing in the first half of this fifth stage (S205).

Figure 34:
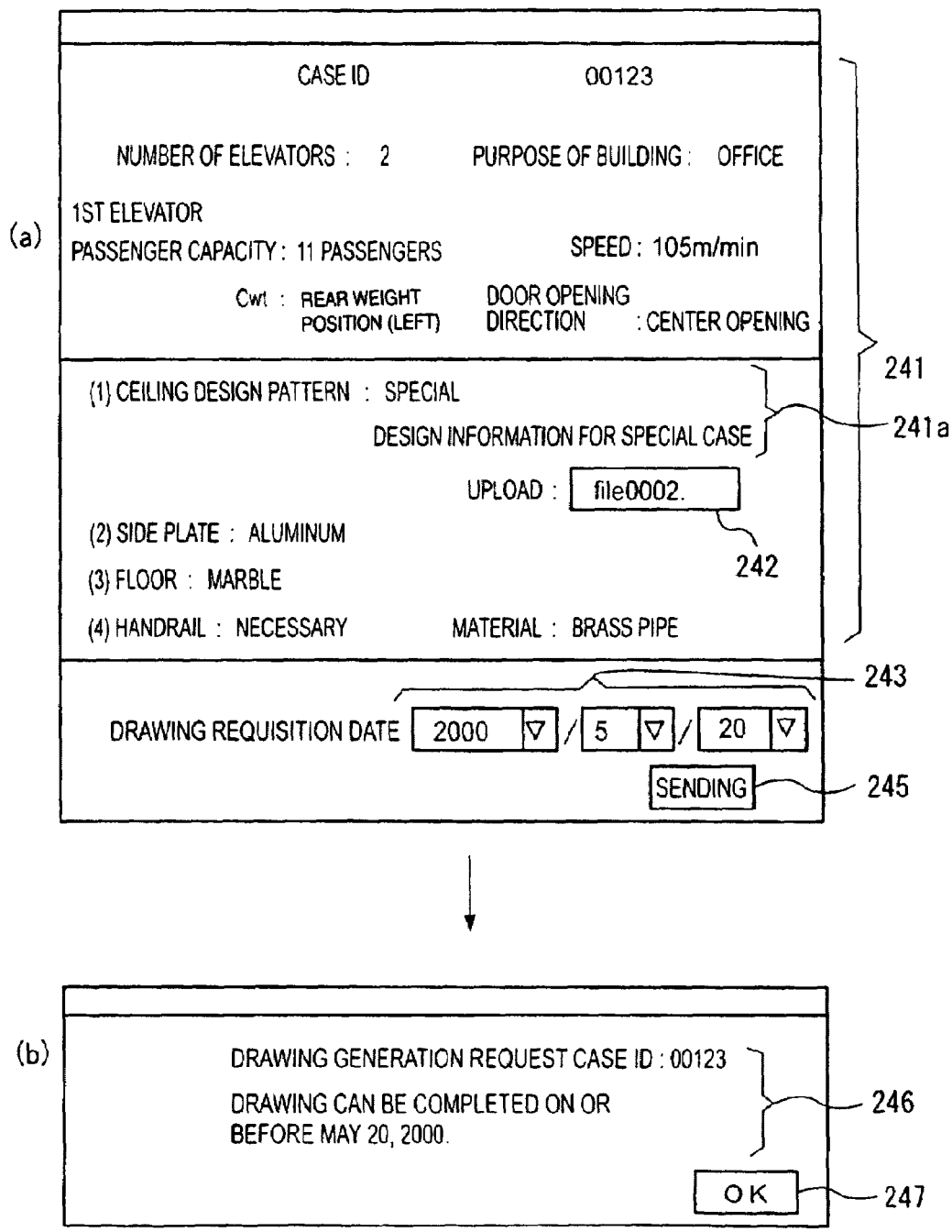
FIG. 34 is a view showing examples of WWW pages opened on a display screen of a user terminal for a building designer.
Figure 35:
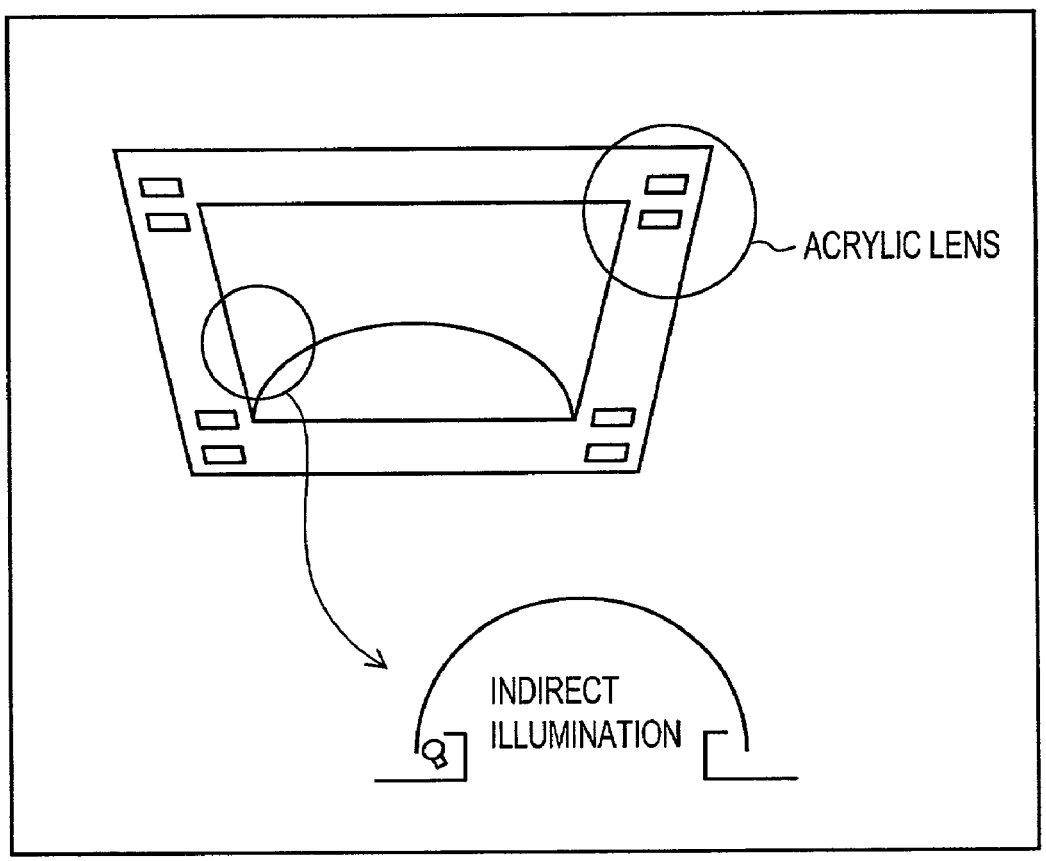
FIG. 35 is a conceptual view showing data stored in an electronic file made by a building designer.

When, in S2045 of the fourth stage, either a special design pattern or a special material is included in the data set in the artistic design specification study page, then, an artistic design drawing generation request page shown in FIG. 34(a) is opened on the display screen of the building designer user terminal 2. This artistic design drawing generation request page displays confirmatory information 241 for confirmation of the data that have been set to that time, and a sending button 245 for instruction of sending the data on display is arranged on this page. Here, in the neighborhood of the confirmatory information 241a on the special ceiling design pattern or special material, is arranged a file name input box 242 for inputting a name of a file (hereinafter, referred to as a design information file) for storing data of the special ceiling design patter or special material desired by the building designer. The building designer should input a suitable electronic file name into the file name input box 242. The design information file, whose name is inputted here, stores a image etc. generated by the building designer using a suitable graphics tool. For example, in the case of a design information file for a special ceiling design pattern, it stores a ceiling design image as shown in FIG. 35.

Further, on this artistic design drawing generation request page, is arranged a drawing requisition date input box 243 for inputting a desired dead line (date) for the artistic design drawing. Thus, the building designer should input suitable data also into the drawing requisition date input box 243, before clicking the sending button 245.

When the building designer inputs suitable data into the input blocks 242 and 243 on this artistic design drawing generation request page, and thereafter clicks the sending button 245, then, a data save request, which includes the data on display, is sent to the database server through the WWW server 12 (S2053).

Receiving this data save request, the database server uploads a design information file corresponding to the file name included in the data save request (S2054). Then, the database server registers the other data included in the data save request and the design information file etc. in association with each other into a design information management database, and its data storage location and the case ID are sent to the building designer user terminal 2.

The building designer user terminal 2 sends an artistic design drawing generation request, which includes the return data, to the management terminal 112 through the WWW server 11. The management terminal 112 first takes out identification information of artistic designers who provide elevator artistic design drawing generation service, from the service management database 116. Further, case IDs and their dead lines corresponding to each piece of identification information obtained this time are taken out from the load database 115. Based on the results, the artistic designer having the least number of cases under his charge is determined as a person to whom plotting of the present artistic design drawing is requested. The dead line of the elevator artistic design drawing data to be requested this time is determined by adding a predetermined working period to the dead line of the last case under the charge of this artistic designer. Then, the management terminal 112 updates the load management database 115 with the result determined this time, and sends the result determined this time and the storage location of the design information file etc. to the WWW server 11.

Receiving the sent data, the WWW server 11 requests the mail server on the network to distribute an e-mail addressed to the person in charge of the artistic design to inform him of the file name and storage location of the design information file, the case ID, and the dead line, and at the same time, sends the case ID and the dead line to the building designer user terminal 2 (S2055).

By this, a dead line answer page shown in FIG. 34(b) is opened on the display screen of the building designer user terminal 2. On this dead line answer page, are displayed the case ID and dead line 246 included in the return data. Further, an OK button 247 is arranged on this dead line answer page. When the building designer confirms the contents on display and thereafter clicks the OK button 247, then, the top page of FIG. 18 is opened again on the display screen of the building designer user terminal 2.

Figure 36:
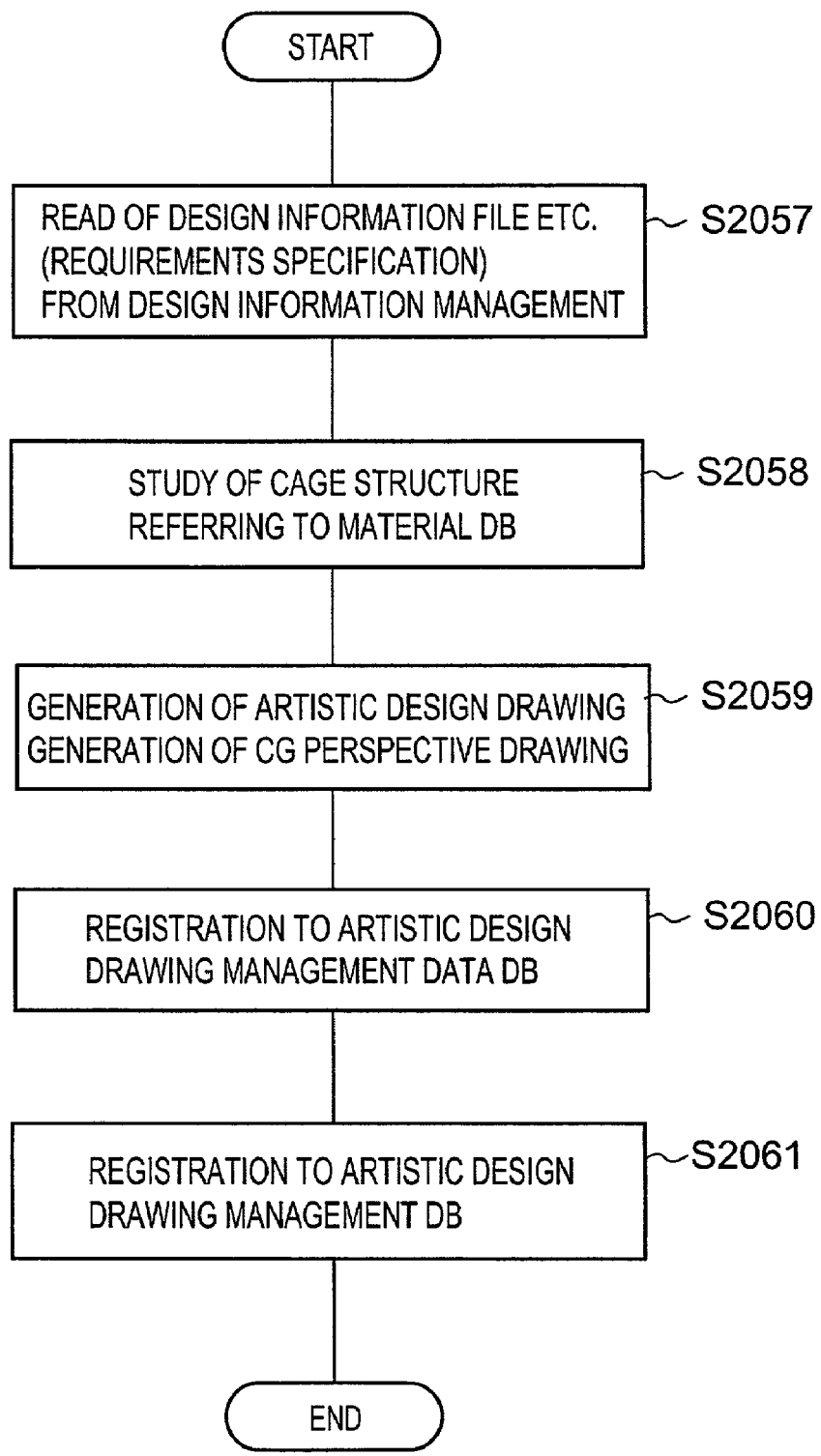
FIG. 36 is a flowchart showing a flow of processing in S205 of FIG. 17.
Figure 37:
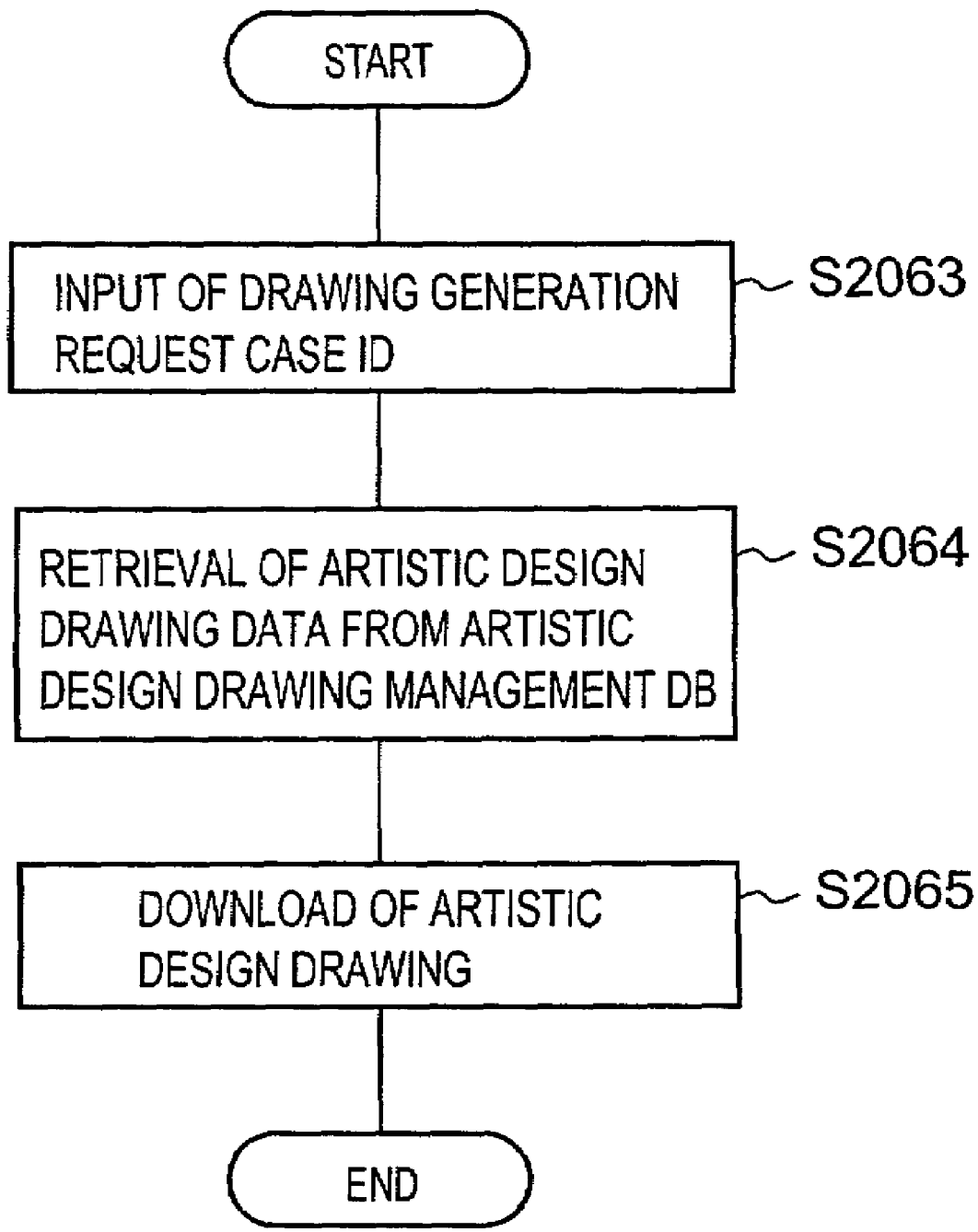
FIG. 37 is a flowchart showing a flow of processing in S205 of FIG. 17.

Flowcharts of FIGS. 36 and 37 show a flow of detailed processing in the latter half of this fifth stage.

In the artistic designer user terminal 100 of the artistic designer determined as the person in charge of the artistic design drawing requested this time, processing shown in FIG. 36 is performed when the time determined in his schedule arrives. First, the design information file etc. are taken out from the design information management database (S2057). Product specification information of an interior material indicated by each piece of the material data taken out this time is retrieved from the material database (S2058). Then, elevator interior decoration structure is determined based on the design information file etc. and the product specification information. Further, based on this result determined, elevator artistic design drawing data and elevator perspective drawing data are generated (S2060). Thus-obtained elevator artistic design drawing data and elevator perspective drawing data are registered into the artistic design drawing management database (S2061). Then, detailed data that have been determined in the above-mentioned processes are registered as studied information additionally into the customer's specification management database. And, the mail server on the network is requested to distribute an e-mail addressed to the client to inform him of the case ID of the artistic design drawing generation request and the storage location of the elevator artistic design drawing data etc.

When the building designer knows the completion of the elevator artistic design drawing data etc. by means of an arrival of the e-mail, then the building designer starts up again the browser on his building designer user terminal 2 to download the elevator artistic design drawing data etc., to establish connection between his building designer user terminal 2 and the WWW server 12, and to open an artistic design drawing download page as shown in FIG. 29(a) on the display screen of his building designer user terminal 2. On this artistic design drawing download page, are arranged a case input box 210 for inputting the case ID of the request for generation of the artistic design drawing that he wishes to download, and a sending button 211 for instruction of sending the case ID of the request for generation of the drawing. When the building designer inputs the artistic design drawing generation request case ID that he knows from the e-mail, into the case input box 210 and thereafter clicks the sending button 211 (S2063), then, a page as shown in FIG. 29(b) is opened. On this page, is arranged an underlined character string 212 for instructing download of the elevator artistic design drawing data. When the building designer clicks this character string 212, then, an artistic design drawing retrieval request, which includes the artistic design drawing generation request case ID, is sent to the database server 12 through the WWW server 11. Correspondingly, the database server 12 takes out the elevator artistic design drawing data etc. associated with the artistic design drawing generation request case ID from the artistic design drawing management database (S2064). Then, the elevator artistic design drawing data is downloaded to the building designer user terminal 2 (S2065).

Thereafter, when it is desired to change the elevator artistic design drawing data on the side of the building designer, then, it is sufficient that the building designer opens the artistic design specification study page on his user terminal 2, inputs the case ID on this page, and sets data again. By this, the user terminal 100 of the artistic designer in charge calculates difference between the data set last time and the data set this time, and corrects the artistic design drawing data based on the difference. Accordingly, on the side of the artistic designer, the corrected artistic design drawing data can be made more promptly than the case where the artistic design drawing data is generated from the beginning, and on the side of the building designer, the corrected artistic design drawing data can be obtained promptly.

The relation between the building designer and the artistic designer is almost similar to the above-described relation between the building designer and the equipment designer. Thus, according to this extended system, the building designer user terminal and the artistic designer user terminal exchange data through databases, and such arrangement absorbs a time lag that may occur between the progress of the design work on the side of the building designer and the progress of the artistic design drawing work on the side of the artistic designer.

Further, a present state of load of each artistic designer is managed, and a new artistic design drawing generation request is entrusted to the artistic designer who has the lightest load at present. Such arrangement gives advantages to the building designer's side by shortening his waiting time between a request and completion of an artistic design drawing, and to the artistic designer's side by improving overall working efficiency caused by leveling of his loads.

In the above description, an elevator is taken as an example of an order-made product. Of course, however, an incidental facility other than an elevator may be taken as an order-made product.

Further, by allowing download of a program that defines the processing performed on the user terminal on the equipment designer's side, installation drawing data can be generated on the user terminal on the side of the building designer also. Of course, it is possible to say similarly, when a program that defines the processing performed on the user terminal on the equipment designer's side is installed onto the user terminal on the building designer's side, from a storage medium that stores the program.

According to the present invention, check of interference between an order-made product and peripheral equipment can be performed accurately and promptly by calculation processing. Thus, it is possible to generate promptly an installation structure plan that can appropriately install an order-made product into a building under design. Owing to this, the building designer is given (1) an advantage that installation structure for equipment is grasped early and thereby a design period is shortened, and the equipment designer (2) an advantage that processing of generating an equipment installation drawing according to building structure is abbreviated and simplified.

Further, in interference study, i.e., in studying if equipment can be housed in a building's main frame, the building designer can ascertain at a glance if the equipment satisfying requirements specification interferes with surrounding building elements. Thus, interference study can be performed more promptly and simply, which also shortens a period that elapses until the building designer obtains the installation structure plan.

Further, according to the present invention, a series of transaction procedures between a person who gives an order of an elevator and a person who receives the order can be performed through a network.

INDUSTRIAL APPLICABILITY

The present invention is useful in that an elevator specification can be easily determined through a network etc. and in that consistency between the elevator in question and design and specification of a building to be installed with the elevator can be adjusted promptly.

The invention claimed is:

1. A remote order acceptance design system, comprising:
   a means for sending a list of basic specifications of a plurality of products that can be sold, to a customer's terminal according to the customer's requirement via a wide area network;
   a database that stores CAD symbols, each including at least product name information, structure information indicating structural features of the product, basic specification information, and occupied space information indicating a space that should be secured for installing the product, for each of said products that can be sold;
   a first input receiving means for receiving input of a requirements specification of an order-made product that includes one or more equipments;
   a data taking means for retrieving the basic specification information stored in said database, based on the requirements specification whose input is received by said first input receiving means, and for taking out a corresponding CAD symbol that includes said occupied space, from said database;
   a data output means for outputting the CAD symbol taken out by said data taking means to an input source that has input the requirements specification of said order-made product;
   a second input receiving means for receiving input of the customer's design data that include the CAD symbol of said order-made product positioned on the customer's design data by the customer via the wide area network;
   a means for extracting structural features within the occupied space information of the CAD symbol of said order made product from the customer's design data received by said second input receiving means, and for judging existence of interference in the occupied space of said order-made product, based on said structural features; and
   an installation drawing generation means for taking out the structure information corresponding to said CAD symbol from said database, when it is judged that interference does not occur in the occupied space of said order-made product, and for generating installation drawing data for said order-made product based on said structure information and said customer's design data,
   wherein said data output means outputs the installation drawing data generated by said installation drawing generation means to an input source that has input said customer's design data.

2. The remote order acceptance design system according to claim 1, further comprising:
   a CAD symbol automatic generation means for generating a CAD symbol of said order-made product based on the requirements specification received by said input receiving means, when said CAD symbol can not taken out from said databases,
   wherein said data output means outputs the CAD symbol generated by said CAD symbol automatic generation means, when said CAD symbol can not be taken out from said database.

3. The remote order acceptance design system according to claim 1, wherein further comprising:
   a customer's design data save means for saving the customer's design data received by said second input receiving means, associating said customer's design data with the input source of the building data; and
   a correction management means for calculating difference between customer's design data after a change and customer's design data before the change, when said second input receiving means receives the customer's design data after the change, and for judging existence of interference in the order-made product's installation area defined by said customer's design data after the change, based on said difference,
   wherein said installation drawing generation means generates installation drawing data of said order-made product based on said structure information and said customer's design data after the change, when it is judged that interference does not occur in said order-made product's occupied space defined in the customer's design data after the change.

* * * * *